(12) United States Patent
Kolowich et al.

(10) Patent No.: US 9,633,358 B2
(45) Date of Patent: Apr. 25, 2017

(54) INTERACTIVE PRESENTATIONS WITH INTEGRATED TRACKING SYSTEMS

(71) Applicant: KnowledgeVision Systems Incorporated, Lincoln, MA (US)

(72) Inventors: Michael E. Kolowich, Lincoln, MA (US); Alexander J. Kieft, Lincoln, MA (US); Kathy P. Doody, Lincoln, MA (US)

(73) Assignee: KnowledgeVision Systems Incorporated, Lincoln, MA (US)

( * ) Notice: Subject to any disclaimer, the term of this patent is extended or adjusted under 35 U.S.C. 154(b) by 268 days.

(21) Appl. No.: 13/838,136

(22) Filed: Mar. 15, 2013

(65) Prior Publication Data

US 2014/0278746 A1    Sep. 18, 2014

(51) Int. Cl.
*G06Q 30/00* (2012.01)
*G06Q 30/02* (2012.01)

(52) U.S. Cl.
CPC ............................... *G06Q 30/0201* (2013.01)

(58) Field of Classification Search
CPC .................................................. G06Q 30/0246
See application file for complete search history.

(56) References Cited

U.S. PATENT DOCUMENTS

| | | | |
|---|---|---|---|
| 5,533,903 A | 7/1996 | Kennedy | |
| 5,613,909 A | 3/1997 | Stelovsky | |
| 5,690,496 A | 11/1997 | Kennedy | |
| 5,953,005 A | 9/1999 | Liu | |
| 6,275,222 B1 | 8/2001 | Desain | |
| 6,760,043 B2 | 7/2004 | Markel | |
| 6,789,228 B1 | 9/2004 | Merril et al. | |
| 6,904,408 B1 * | 6/2005 | McCarthy et al. | ............... 705/2 |
| 7,379,848 B2 | 5/2008 | Yu et al. | |
| 7,496,845 B2 | 2/2009 | Deutscher et al. | |
| 7,689,898 B2 | 3/2010 | Merril et al. | |
| 7,739,584 B2 | 6/2010 | Vella et al. | |
| 7,851,689 B2 | 12/2010 | Reynolds et al. | |

(Continued)

OTHER PUBLICATIONS

Office Action from U.S. Appl. No. 13/303,820, Notification Date: May 8, 2015.

*Primary Examiner* — Bennett Sigmond
*Assistant Examiner* — Scott C Anderson
(74) *Attorney, Agent, or Firm* — Hamilton, Brook, Smith & Reynolds, P.C.

(57) ABSTRACT

Systems and methods for tracking user interaction in a presentation may be provided. A presentation may be augmented to include user interaction tracking features, which facilitate tracking of a user's clickstream and browser session data generated during the playback of the presentation. A player may be configured to play the presentation and to track the user's browser session and clickstream data. The presentation player may be configured to dispatch this tracking data to a tracking server system. The server may be configured to facilitate calculation of an engagement score based on the tracking data, which indicates the user's level of engagement with the presentation. The engagement score and at least portions of the tracking data can be transmitted to a third party system, such as a marketing automation system, to trigger a responsive event. The responsive event may be generated based at least in part on the engagement score.

14 Claims, 25 Drawing Sheets

(56) References Cited

U.S. PATENT DOCUMENTS

| | | | |
|---|---|---|---|
| 7,870,488 B2 | 1/2011 | Kirkpatrick | |
| 8,060,463 B1* | 11/2011 | Spiegel | G06Q 30/02 |
| | | | 707/609 |
| 8,401,163 B1* | 3/2013 | Kirchhoff | H04L 29/06197 |
| | | | 370/356 |
| 2002/0120939 A1 | 8/2002 | Wall et al. | |
| 2004/0133909 A1* | 7/2004 | Ma | G06Q 30/0207 |
| | | | 725/34 |
| 2004/0267612 A1 | 12/2004 | Veach | |
| 2005/0257158 A1* | 11/2005 | Lombardo | G06F 17/2288 |
| | | | 715/751 |
| 2006/0129908 A1 | 6/2006 | Markel | |
| 2007/0118801 A1 | 5/2007 | Harshbarger et al. | |
| 2007/0240230 A1* | 10/2007 | O'Connell | G06F 21/55 |
| | | | 726/28 |
| 2007/0244985 A1* | 10/2007 | Svendsen | H04N 7/173 |
| | | | 709/217 |
| 2008/0028026 A1* | 1/2008 | Chen | G06Q 10/107 |
| | | | 709/206 |
| 2008/0065977 A1 | 3/2008 | Gottlieb et al. | |
| 2008/0091778 A1 | 4/2008 | Ivashin et al. | |
| 2008/0092159 A1* | 4/2008 | Dmitriev et al. | 725/34 |
| 2008/0104503 A1 | 5/2008 | Beall et al. | |
| 2008/0201348 A1* | 8/2008 | Edmonds | G06Q 30/02 |
| 2008/0320378 A1 | 12/2008 | Shuter et al. | |
| 2009/0063945 A1 | 3/2009 | Bhogal et al. | |
| 2009/0066722 A1 | 3/2009 | Kriger et al. | |
| 2009/0265196 A1* | 10/2009 | Dewar | G06Q 10/063 |
| | | | 705/7.11 |
| 2010/0214323 A1 | 8/2010 | Sakaue | |
| 2010/0281378 A1 | 11/2010 | Pendergast et al. | |
| 2010/0281386 A1 | 11/2010 | Lyons et al. | |
| 2010/0287134 A1* | 11/2010 | Hauser | G06Q 10/06375 |
| | | | 706/54 |
| 2010/0318916 A1 | 12/2010 | Wilkins | |
| 2010/0328465 A1 | 12/2010 | Merril et al. | |
| 2011/0004898 A1* | 1/2011 | Ritter | G06Q 30/02 |
| | | | 725/32 |
| 2011/0283243 A1 | 11/2011 | Eckhardt et al. | |
| 2012/0023407 A1 | 1/2012 | Taylor | |
| 2012/0192106 A1 | 7/2012 | Kieft et al. | |
| 2015/0244758 A1 | 8/2015 | Kolowich et al. | |

\* cited by examiner

Hello,

A viewer (jerry.smith@newco.com) just watched your KnowledgeVision presentation "Secrets of Content Marketing" and was highly engaged with your content.

This viewer:
- Earned a 9 out of 10 Engagement Score
- Watched 93% of the video (10:36 out of 11:21)
- Viewed 8 out of 9 slides
- Stayed on the page for 9 minutes and 27 seconds

They also:
- Clicked on 2 footnote links:
  - http://www.acme.com/why-acme.html
  - http://www.twitter.com/acme
- Downloaded 1 attachment:
  - http://present.knowledgevision.com/account/acme/assets/attachments/whitepaper.pdf
- Clicked on 1 image link:
  - http://www.acme.com/home This viewer has watched this presentation a total of 2 times.

We know the following about this viewer:
- Visitor ID: jerry.smith@newco.com
- URL tags:
  - ref: homepage
- IP address: 209.6.90.20
- Cookie ID: G6Elu13401218134883

Click here to view the full activity report for this presentation.

- The KnowledgeVision Team

Edit Title and Description

630

Form Title | Secrets of Content Marketing

Form Description

You will be automatically redirected to my presentation after completing this form.

FIG. 6D

| Visitor ID | Form: Name | Form: Email | Form: Company |
|---|---|---|---|
| mmadison@smithco.com | Mark Madison | mmadison@smithco.com | Smith & Co. |
| jane.grant@newco.com | Jane Grant | jane.grant@newco.com | Newco Inc. |
| john@acme.com | John Smith | john@acme.com | Acme Co. |

FIG. 6E

| B | C | D | E |
|---|---|---|---|
| Form: Email | Form: Name | Form: Company | Visitor ID |
| mmadison@smith.com | Mark Madison | Smith & Co. | mmadison@smith.com |
| jane.grant@newco.com | Jane Grant | Newco Inc. | jane.grant@newco.com |
| john@acme.com | John Smith | Acme Co. | john@acme.com |

FIG. 6F

We know the following about this viewer:
- Visitor ID: john@acme.com
- Form data:
  - Company: Acme Co.
  - Email: john@acme.com
  - Name: John Smith
- IP address: 173.76.555.248
- Cookie ID: Oriml1355511197806

FIG. 6G

☐ Original URL:
http://www.knowledgevision.com/demonstration

☐ Tagged URL:
http://www.knowledgevision.com/demonstration?email=jerry@acme.com

INTERACTIVE PRESENTATIONS WITH INTEGRATED TRACKING SYSTEMS

RELATED APPLICATION

This application is related to U.S. application Ser. No. 13/303,820, filed on Nov. 23, 2011. The entire teachings of the above application are incorporated herein by reference.

BACKGROUND

As bandwidth has increased over the years, content providers have trended toward producing interactive presentations with rich media. Rich media production software allows content providers to create and deliver engaging interactive presentations quickly and effectively. Interactive content in a presentation may be prerecorded or part of a live performance. For example, a broadcast or webinar may be a live or recorded multimedia presentation. Online multimedia may be downloaded or streamed. Streaming multimedia may be live or on-demand.

SUMMARY

While the various formats of digital multimedia have enhanced the viewer's experience with interactive presentations, limitations remain. For example, the ability to measure the viewer's experience with an interactive presentation is often limited to whether the user watched it. With conventional interactive presentation systems, content providers are often unable to determine what an individual viewer clicked on, how much time they spent on it, whether they went back to view portions again, and whether they clicked on interactive links associated with media in the interactive presentation, and turn that information into actionable insight and intelligence.

Systems and methods may be provided for facilitating enhanced tracking of user interaction in an interactive electronic presentation and triggering actions in response to the tracking data. An interactive presentation may be integrated with a tracking system. The integrated tracking system presentation may be configured to facilitate tracking of a user's clickstream/eventstream data generated at a client system from which the user is operating. A presentation player may be in communication with the tracking system presentation. The presentation player may be configured to implement the tracking system presentation in a browser session. The presentation player may be configured with an event monitor, such as a listener. The event monitor may be arranged to track the user's browser session and clickstream data during playback of the tracking system presentation.

The presentation player may be configured with embedded code, such a wrapper around the player. The wrapper may manage communications with an application server. The wrapper may be configured to create a message including the user's browser session and clickstream data, and sent it to an application server. The application server may be configured to respond to the message by processing the user's browser session and clickstream data, and calculate an engagement score based this processed information. The engagement score may reflect a qualified calculation of the user's level of engagement with the tracking system presentation.

The application server may be configured to send the engagement score and at least portions of the user's browser session and click stream data to a third party marketing automation system, which causes the third party marketing automation system to trigger a follow-up event directed at the user.

The tracking system presentation may be an interactive presentation structured with chapters, footnotes, presentation slides, and action buttons. The tracking system presentation may be configured to facilitate tracking of the user clickstream data by configuring the tracking system presentation using a key reference link. The key reference link may be offered to the user during playback of the tracking system presentation to advantageously measure the user's foreground and background activity. By offering a key reference link during playback of the tracking system presentation, the system may have the ability to measure the quality of the user's engagement, which can be factored into the engagement score to trigger actions in the third party marketing automation system. If the key reference link is clicked on by the user during playback of the tracking system presentation, the engagement score may be increased. The key reference link in the tracking system presentation may be a footnote. The third party marketing automation system configured to respond to a high engagement score by triggering an immediate event. For example, the immediate event may cause a call to be placed to the user.

The application server may be configured to respond to the user's browser and clickstream data by: storing the user's browser and clickstream data in a database; queuing a message to be transmitted to the third party marketing automation system, the message including at least portions of the user's browser and clickstream data and a calculated engagement score; and delaying transmission of the message and calculation of the engagement score until the user's browser session is complete.

An ID associated with the user may be passed to the player from the server in response to processing registration/authentication data associated with the user. When the user's clickstream and browser session data is transmitted to the application server, the user's ID may be included in the package. In another embodiment, an ID associated with the user may be generated by the player. The player generated ID may be transmitted to the application server in a package with the user's browser and clickstream data.

The engagement score may be configured with one or more trigger points (thresholds). Each trigger point may trigger a unique event by the third party marketing automation system. The engagement score may be a qualified measurement of the user's level of engagement, which may be calculated based on: reference links in the tracking system presentation clicked on by the user; whether the user has viewed portions of the tracking system presentation more than once; how much time the user has spent viewing the tracking system presentation. The engagement score may be calculated based on the amount of foreground versus background activity. For example, the value of engagement score may be low if significant background activity by the user is detected. The value of the engagement score may be decreased if the system detects that the user has skipped through at least a portion of a video included in the tracking system presentation.

The application server may create a summary of the user's clickstream and browser session data, the summary is the portion of the user's clickstream and browser session data that is dispatched to the third party marketing automation system.

A computer program product stored on a non-transitory computer readable medium may be provided. The computer program product may integrate a presentation with a tracking system to facilitate tracking of a user's clickstream data generated at a client system during playback of the presentation in a browser session. The computer program product may monitor playback of the tracking system presentation by tracking session and clickstream data. The computer program product may direct the tracked session and clickstream data to another system, such as an application server, or another software application, which responds by calculating an engagement score. The engagement score may be calculated based on the user's browser session and clickstream data. The calculated engagement score may trigger a response from an automated third party system, such as a marketing automation system, customer management system or a learning management system.

An electronic media player may be provided. The media player may be configured to facilitate tracking of user interaction with an electronic presentation. The media player may include a listener configured to detect clickstream data associated with a user's interaction with a tracking system presentation. The media player may include a wrapper, in communication with the listener, that is configured to cache clickstream data detected by the listener. The player may be embedded within the wrapper. The player may be configured to facilitate playback of the tracking system presentation in the browser session. The wrapper may be configured to transmit browser session data and the clickstream data to another system, such as an application server or another software system. The other system may responds by calculating an engagement score based on the browser session and clickstream data. The calculated engagement score may cause triggered response from an automated third party system.

An application server system may be configured to facilitate tracking of user interaction with an electronic presentation. The server system may be configured to receive browser session data and clickstream data resulting from a user's browser session with a tracking system presentation. The server system may be configured to calculate an engagement score based on the clickstream data, which reflects a level of engagement by the user in connection with the tracking system presentation. The server system may be configured to transmit, to a third party system, the calculated engagement score and at least portions of the browser session data and clickstream data resulting from the tracking system presentation. The server system may be configured to request a trigger action from the third party system in response to the calculated engagement score.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 5D shows an example of a tracking notification email message.

FIGS. 6B, 6C, and 6D show example interfaces from the presentation production client for configuring and editing the tracking registration form.

FIGS. 6E, 6F, and 6G show various embodiments in which tracking registration form data is reported to the content provider using the presentation production client.

DETAILED DESCRIPTION

A description of example embodiments of the invention follows.

Digital Processing Environment

Figure 1A:
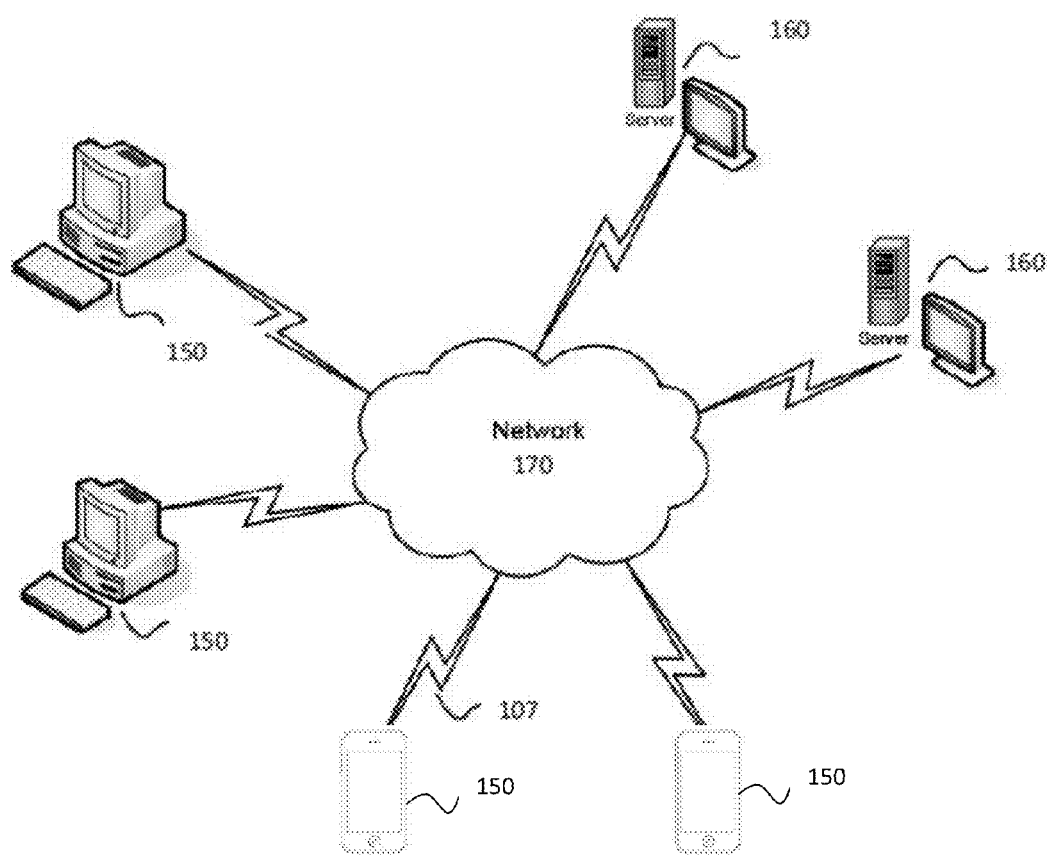
FIG. 1A is a schematic diagram of an example computer network environment in which embodiments are deployed.

Example implementations of a tracking system may be implemented in a software, firmware, or hardware environment. FIG. 1A illustrates one such environment. Client computer(s)/devices 150 (e.g. mobile phone) and a cloud 160 (or server computer or cluster thereof) provide processing, storage, and input/output devices executing application programs and the like.

Client computer(s)/devices 150 are be linked through communications network 170 to other computing devices, including other client devices/processes 150 and server computer(s) 160. Communications network 170 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Sever computers 160 may be configured to facilitate implementation of a tracking system presentation, which is processed and played at client computer(s)/devices 150. In one example embodiment, one or more of the servers 160 are Java application servers. The Java application servers are scalable such that if there are spikes in traffic, the servers can handle the load increase. The Java application servers may be configured to write to databases (such as the DynamoDB 108 in FIGS. 2A and 2B) tracking, clickstream, session, and registration data regarding instances of a tracking system presentation processed at client computer(s)/devices 150. A second set of servers may be provided to maintain a queue, which tracks and responds to client interaction with the tracking system presentation 300.

Figure 1B:
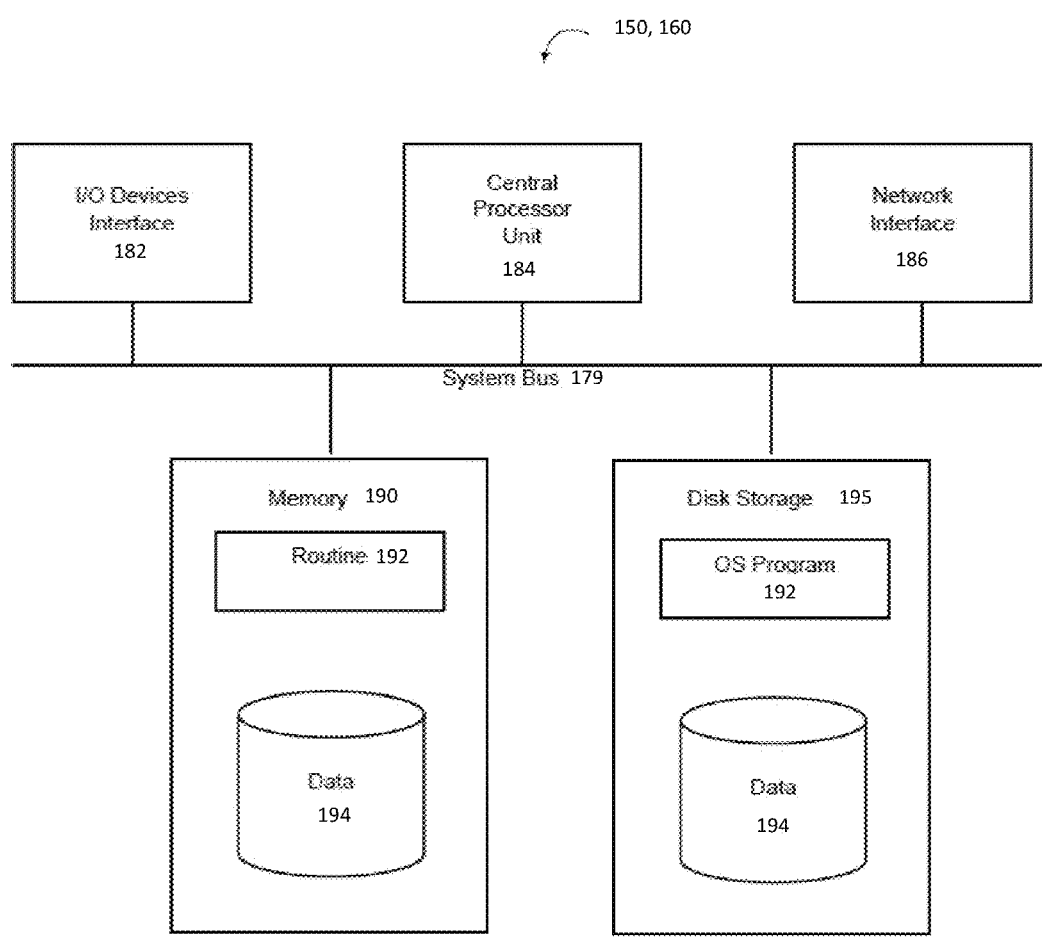
FIG. 1B is a block diagram of the computer nodes in the network of FIG. 1A.

Embodiments of the invention may include means for displaying audio, video or data signal information. FIG. 1B is a diagram of the internal structure of a computer/computing node (e.g., client processor/device/mobile phone device/tablet 150 or server computers 160) in the processing environment of FIG. 1A, which may be used to facilitate displaying such audio, video or data signal information. Each computer 150, 160 contains a system bus 179, where a bus is a set of actual or virtual hardware lines used for data transfer among the components of a computer or processing system. Bus 179 is essentially a shared conduit that connects different elements of a computer system (e.g., processor, disk storage, memory, input/output ports, etc.) that enables the transfer of data between the elements. Attached to system bus 179 is I/O device interface 182 for connecting various input and output devices (e.g., keyboard, mouse, touch screen interface, displays, printers, speakers, etc.) to the computer 150, 160. Network interface 186 allows the computer to connect to various other devices attached to a network (for example the network illustrated at 170 of FIG. 1A). Memory 190 provides volatile storage for computer software instructions 192 and data 194 used to implement a software implementation of the present invention (e.g. tracking system 100 of FIG. 2A).

The software components tracking system 100 described herein may be configured using any known programming language, including any high-level, object-oriented programming language. The tracking system 100 may include instances of a player 102, 102-1, 102-2, . . . , 102-n. The player may be implemented via a software embodiment and may operate within a browser session.

The player, for example, may be developed using HTML code, JavaScript and Flash. The HTML code may be configured to embed the player into a web browsing session at a client 150. The Java Script can be configured to perform clickstream and session tracking at the client 150 and store the tracking data in a cache.

In another embodiment, the player may be implemented in HTML 5 for client devices 150 that do not have Flash installed.

The player may be configured to load an XML data file with information about where components of the tracking system presentation 300 are stored or hosted, such as video, images, and timing information, footnote, attachments, interactive components, style sheets, etc.

In an example mobile implementation, the user interface framework for the player 102 may be based on XHP, Javelin and WURFL. In another example mobile implementation for OS X and iOS operating systems and their respective APIs, Cocoa and Cocoa Touch may be used to implement the player 102 using Objective-C or any other high-level programming language that adds Smalltalk-style messaging to the C programming language.

Disk storage 195 provides non-volatile storage for computer software instructions 192 (equivalently "OS program") and data 194 used to implement embodiments of the tracking system 100 of the present invention. Central processor unit 184 is also attached to system bus 179 and provides for the execution of computer instructions.

In one embodiment, the processor routines 192 and data 194 are a computer program product, display engine (generally referenced 192), including a computer readable medium capable of being stored on a storage device 195, which provides at least a portion of the software instructions for the tracking system 100. Instances of the player 102, 102-1, 102-2, . . . 102-n and other software embodiments of the tracking system 100, such as instances of the presentation development environments 110-1, 110-2 may be implemented as a computer program product 192, and can be installed by any suitable software installation procedure, as is well known in the art. In another embodiment, at least a portion of the tracking system software instructions may also be downloaded over a cable, communication and/or wireless connection. In other embodiments, the tracking system 100 software components, such as instances of the player 102, 102-1, 102-2, . . . 102-n, may be implemented as a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present tracking system invention routines/program 192.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is transmitted over the propagation medium over a period of time, such as the instructions for a software application sent in packets over a network over a period of milliseconds, seconds, minutes, or longer. In another embodiment, the computer readable medium of computer program product 192 is a propagation medium that the computer system 150 may receive and read, such as by receiving the propagation medium and identifying a propagated signal embodied in the propagation medium, as described above for computer program propagated signal product.

System Architecture

Figure 2A:
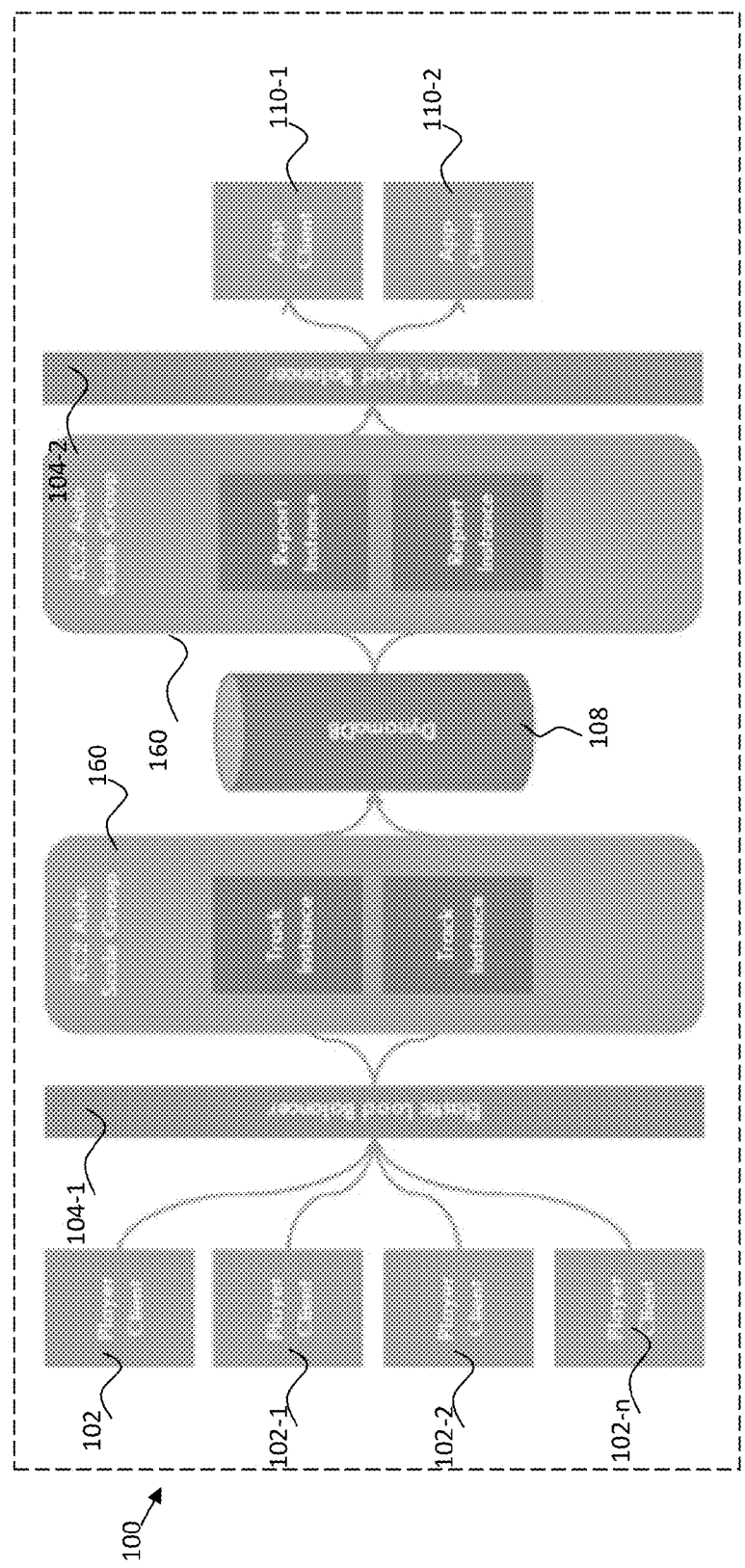
FIGS. 2A and 2B are system architecture diagrams showing the tracking system 100 according to an embodiment of the invention.
Figure 2B:
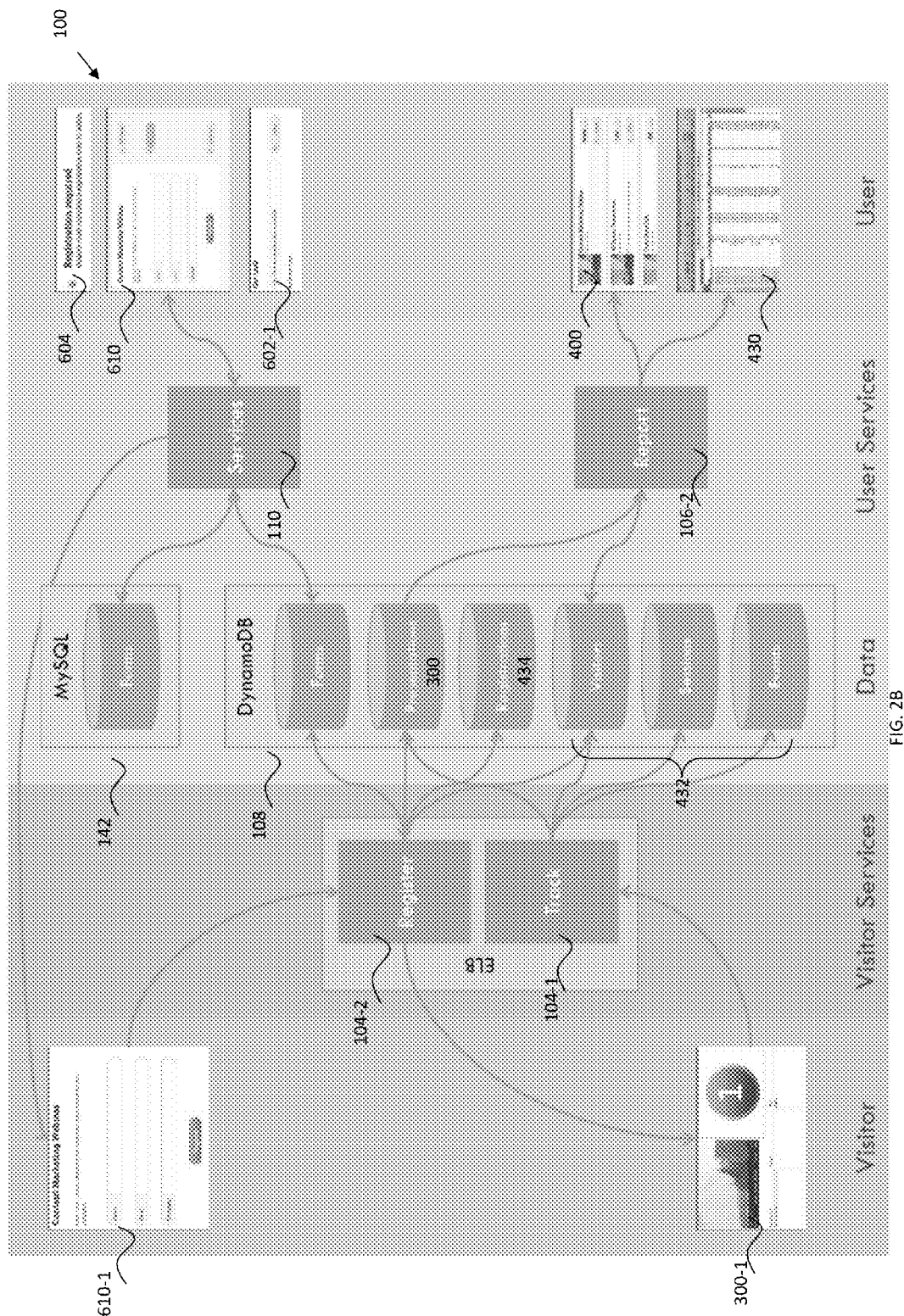

FIG. 2A is a high-level system architecture diagram showing the tracking system 100 according to an embodiment of the invention. FIG. 2B shows a more granular system architecture for the tracking system 100 in FIG. 2A with the registration components 610-1, 104-2, 604, 610. The tracking system 100 includes player clients 102, 102-1, 102-2, . . . 102-n. The player clients 102, 102-1, 102-2, . . . 102-n are instances of client side software operating on respective client systems 150 of viewers/visitors. The player clients 102, 102-1, 102-2, . . . 102-n, for example, can be configured to process the tracking system presentation 300 content, loads its slides, and manage/monitor events associated with the session.

The tracking system presentation 300 may be configured and managed by a service 110 that provides instances of presentation production application clients 110-1, 110-2, which may be used by content providers to implement and manage their respective tracking system presentations 300.

The tracking system service 110 allows content providers to implement their respective online presentations as tracking system presentations 300, which include enhanced tracking, monitoring and event triggering features. A subject tracking system presentation may be configured to ensure that a visitor registers 610-1 before being granted viewing access to the presentation. Registration data 434 may be sent via the elastic load balancer 104-2. Each track instance server 106-1 processes tracking data as it comes in and stores it in a database 108.

With a tracking system presentation 300, the content provider can be provided with tracking data report 106-2 that includes session and clickstream information regarding views and interactions at the individual viewer level, as well as across groups of viewers. This allows a content provider to more easily identify which specific viewers have viewed their online video presentation and exactly how they engaged with it. With the tracking system 100, content providers can track a variety of information about viewers, including who watched their tracking system presentation 300; when they watched it; how long they watched it; how deep they got in it; how much material they skipped; what reference links they clicked; what virtual handouts they downloaded; and where they're from.

Tracking data 432 is collected from each player client 102, 102-1, 102-2, . . . 102-n and sent through an Elastic Load Balancer 104-1 to an auto-scaling group of track instance servers 160. The player clients 102, 102-1, 102-2, . . . 102-n dispatch via the elastic load balancer 104-1 tracking data 432 to the servers 160 as each viewer watches a subject tracking system presentation. The tracking data 432 may include a data package about what is happening at a particular moment in time in connection with a subject tracking system presentation.

Tracking data 432, for example, may include any type of information about the viewer's session and clickstream in connection with the tracking system presentation. In turn, the tracking data 432 may be assigned an engagement score and processed into actionable insight and intelligence, which can trigger other software action items (automated processes) that can take subsequent actions, including triggering processes from third party systems, such as marketing automation systems. The engagement score, for example, may be a unique number for each view, showing on a 0 to 10 scale how deeply engaged each viewer is with the material in the tracking system presentation 300, based on tracking data, such as viewing time and links clicked.

A subject tracking system presentation may be configured to ensure that a visitor registers 610-1 before being granted viewing access to the presentation. Registration data 434 may be sent via the elastic load balancer 104-2. Each track instance server 106-1 processes tracking data 432 as it comes in and stores it in a database 108.

In one embodiment, the database may be a DynamoDB, which is a scalable NoSQL database service. The NoSQL 108 database has no fixed schema, which makes it advantageous for use in the tracking system 100 since it is highly scalable, such that it can scale increased capacity easily. In this way, the NoSQL 108 database can easily handle spikes of traffic. Because the example NoSQL database 108 does not have fixed schema, columns can be dynamically created in the database. For instance, if a subject tracking system presentation includes several links and handouts, the NO SQL database 108 can dynamically keep detect all of the links/attachments.

When a user wishes to access this data via the application presentation production environment 110-1 or 110-2, it makes a request to an auto-scaling group of report instance servers 106-2. The report instance server 106-2 retrieves the requested data from DynamoDB 108 and returns it to the presentation production environment 110-1 or 110-2.

Tracking System Presentations

Figure 3:
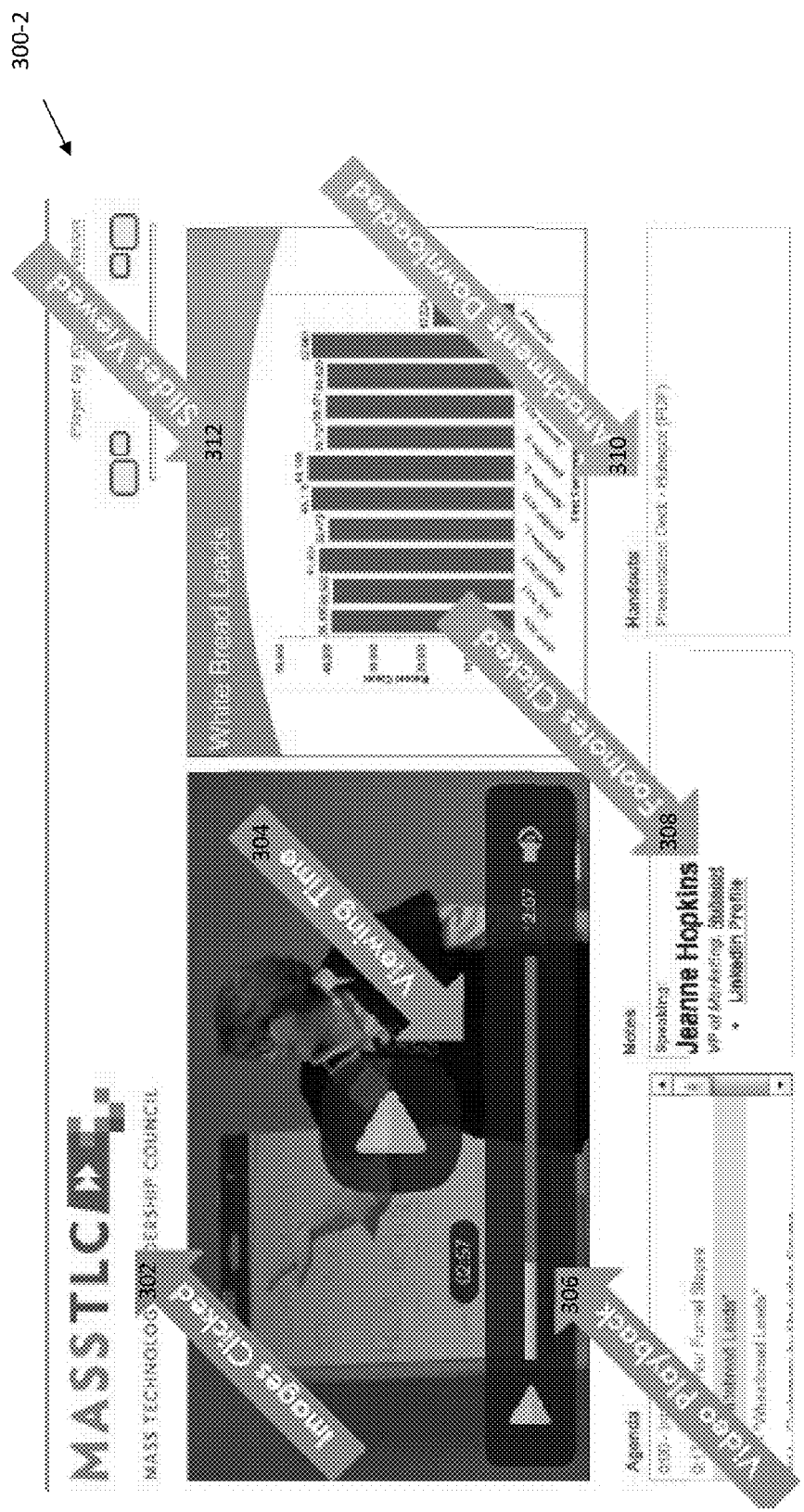
FIG. 3 is an example of an interface of a tracking system presentation according to an embodiment of the invention.

FIG. 3 is an example of an interface 300-1 of an example tracking system presentation 300 according to an embodiment of the invention. It should be noted that the interface of a tracking system presentation 300 is customizable by the content provider (developer). The tracking system presentation 300 may be implemented as an on demand or recorded video, or as live stream webinar or real-time content. The tracking system presentation 300 may be a video-synchronized presentation, or audio-synchronized presentation. The tracking system presentation 300 media stream can be video, audio, or some other media stream (like maybe a MIDI music stream or a recorded whiteboard rendering).

In the example presentation interface 300-1 shown in FIG. 3, a video player, slideshow, chapter list, synchronized footnotes, downloadable attachments, a hyperlinked logo image, and a zoom control are provided as components of the example tracking system presentation 300-1.

The tracking system 100 captures data about video playback 306 (how much of the video the viewer watched), viewing time 304 (how long the viewer remained on the page), and slides viewed 312 (which slides were seen by the viewer), as well as which footnote links 308, attachments 310, and hyperlinked images 302 were clicked, and how many times.

The content included to configure the tracking system presentation 300 may be strategically selected to try to enhance the accuracy of the tracking data 432 and related follow-up trigger actions. For example, a footnote link may be provided during a webinar based tracking system presentation 300. The footnote link may be strategically placed in order to try to lure the viewer to click on it during the session to enable the system 100 to be able to more accurately measure foreground and background activity. By monitoring the interaction with such strategically placed content, the tracking system 100 can configure a tracking system presentation 300 that can accurately measure the quality of viewer's engagement (engagement score) and proactively trigger responsive actions in third party systems.

Tracking Reports

Figure 4A:
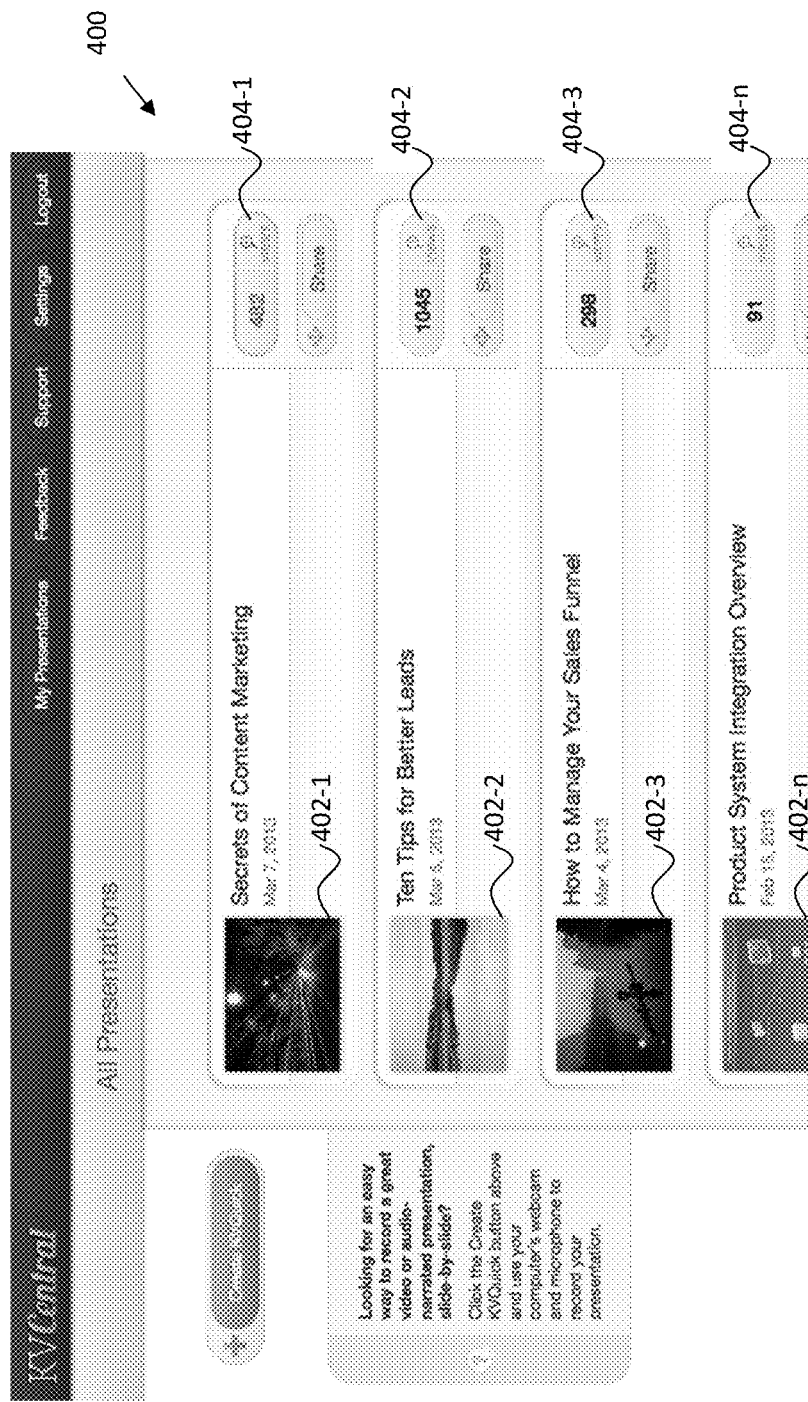
FIG. 4A shows an example central interface of a presentation production client according to an embodiment of the invention.

FIG. 4A shows an example central interface 400 of the presentation production client 110-1 or 110-2 according to an embodiment of the invention. The presentation production client central interface 400 includes a list 402-1, 402-2, 402-3, . . . 402-n of example tracking system presentations 300. The content provider via a presentation production client 110-1, 110-2 may access tracking data 432 for a particular tracking system presentation (e.g. one of 402-1, 402-2, 402-3, . . . 402-n) by clicking the "Views" button (e.g. one of 442-1, 404-2, 404-3, . . . 404-n).

Figure 4B:
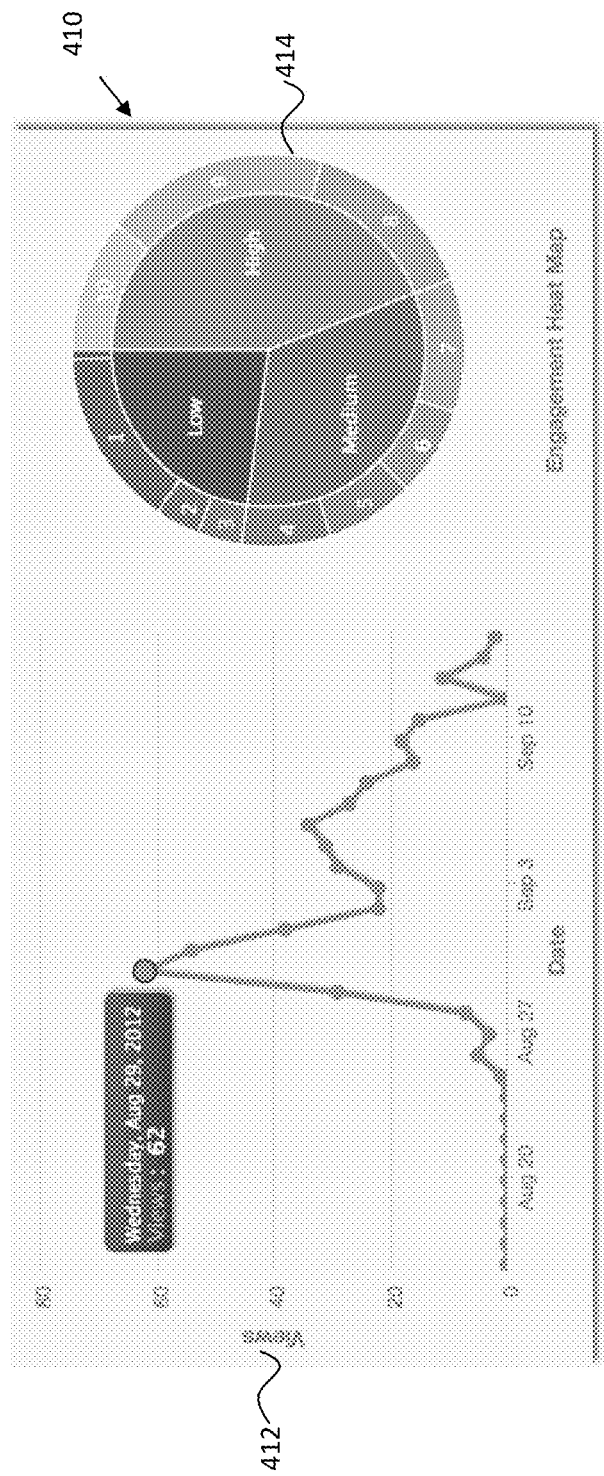
FIG. 4B shows an example of the charts based on tracking data generated by the presentation production client.

FIG. 4B shows an example of the charts 410 rendered in the central interface 400 based on the tracking data 432. The tracking data 432 may be generated in response to selecting one of the view buttons 442-1, 404-2, 404-3, . . . 404-n of the central interface 400 of FIG. 4A. The chart on the left shows the number of views 412 the presentation received for each day during the past 30 days. The pie chart on the right is an engagement heat map 414. This pie chart 414 shows the proportion of viewers who earned different engagement scores from 1 to 10, grouped in "Low," "Medium," and "High" categories.

Figure 4C:
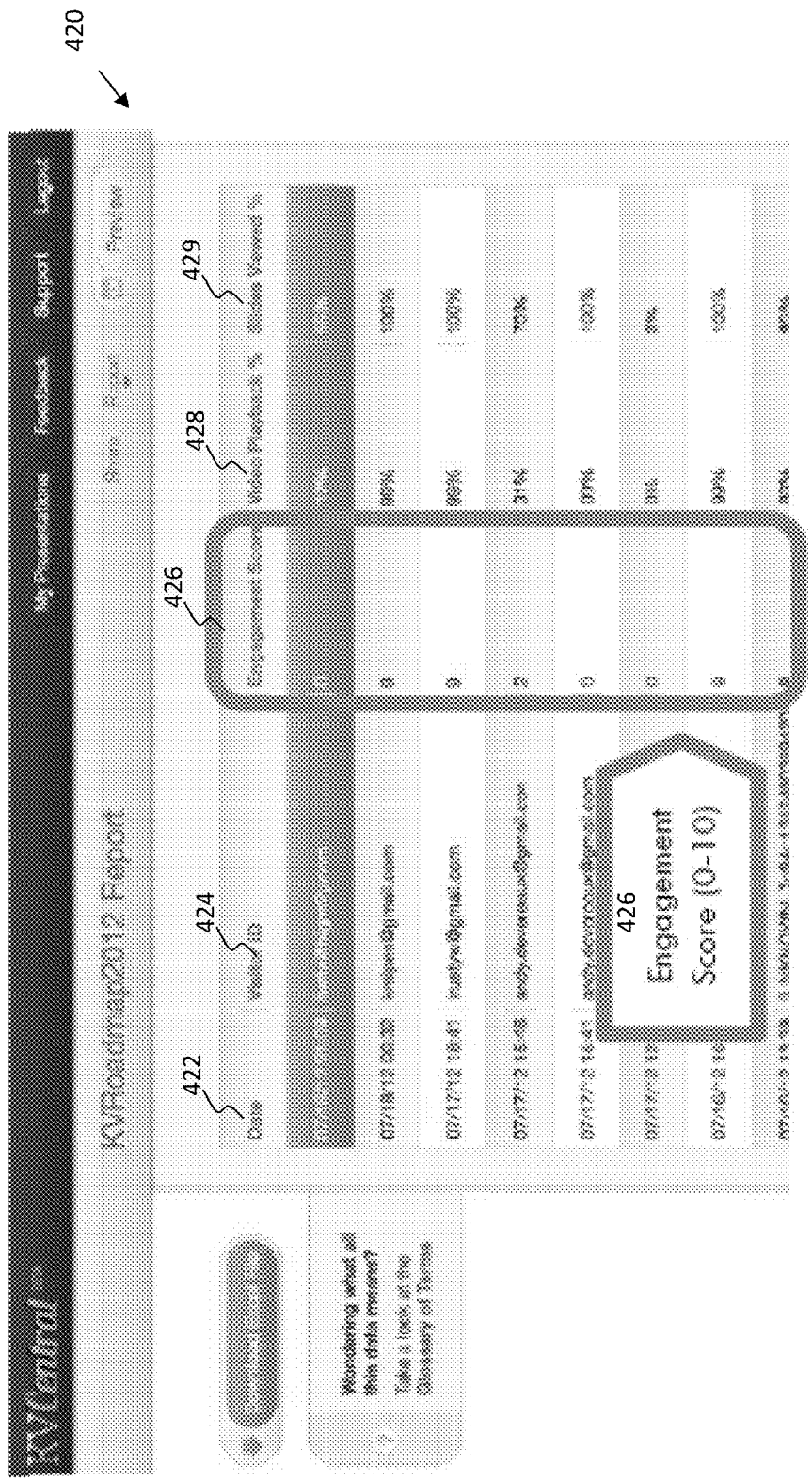
FIG. 4C shows an example track report preview generated in the presentation production client.

An instance of a presentation production client 110-1, 110-2 may be used by a content provider to configure its tracking system presentations 300. The tracking system presentation 300 may be configured so that downloadable track reports are generated, which show how each viewer interacted with their respective presentations. FIG. 4C shows an example track report preview 420. The tracking report 420 lists the most recent unique viewers of a subject tracking system presentation. In the example report preview 420 shown in FIG. 4C, the date 422, viewer ID 424, engagement score 426, video playback % 428, and slides viewed % 429 are listed for each unique viewer of the subject tracking system presentation. In the upper-left corner of the interface, the content provider may click the "Download Excel File" button to download a complete report in Excel spreadsheet format.

Figure 4D:
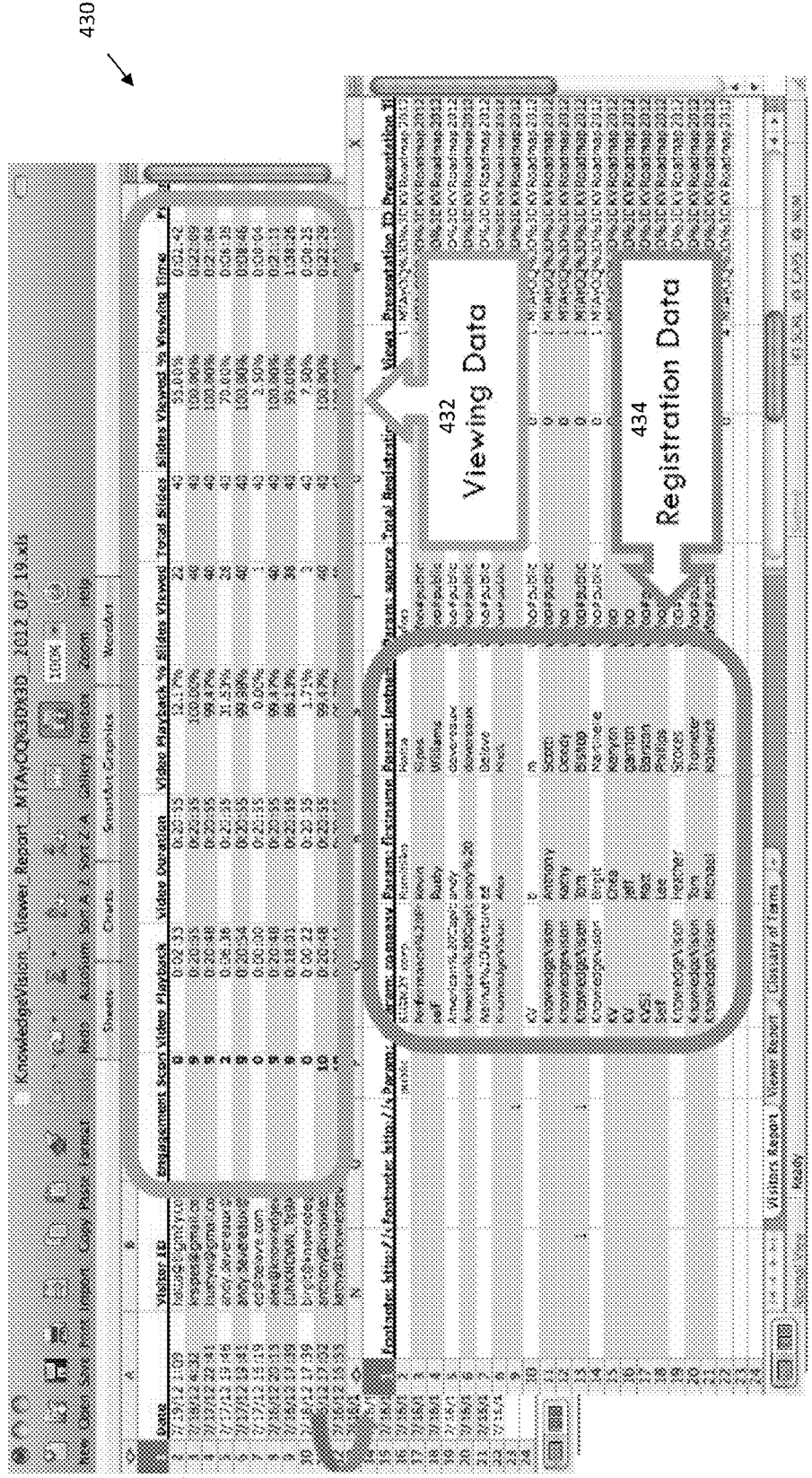
FIG. 4D shows an example of a full report from the presentation production client.

FIG. 4D shows an example of a full report 430 from the presentation production client 110-1, 110-2. In this example, the full report 430 is provided in Excel spreadsheet format. The tracking data 432 collected from the viewing session. The tracking data 432 is associated directly with the registration data 434. Registration data 434 includes demographic information about the viewer collected from a registration form.

Tracking Notifications

Figure 5A:
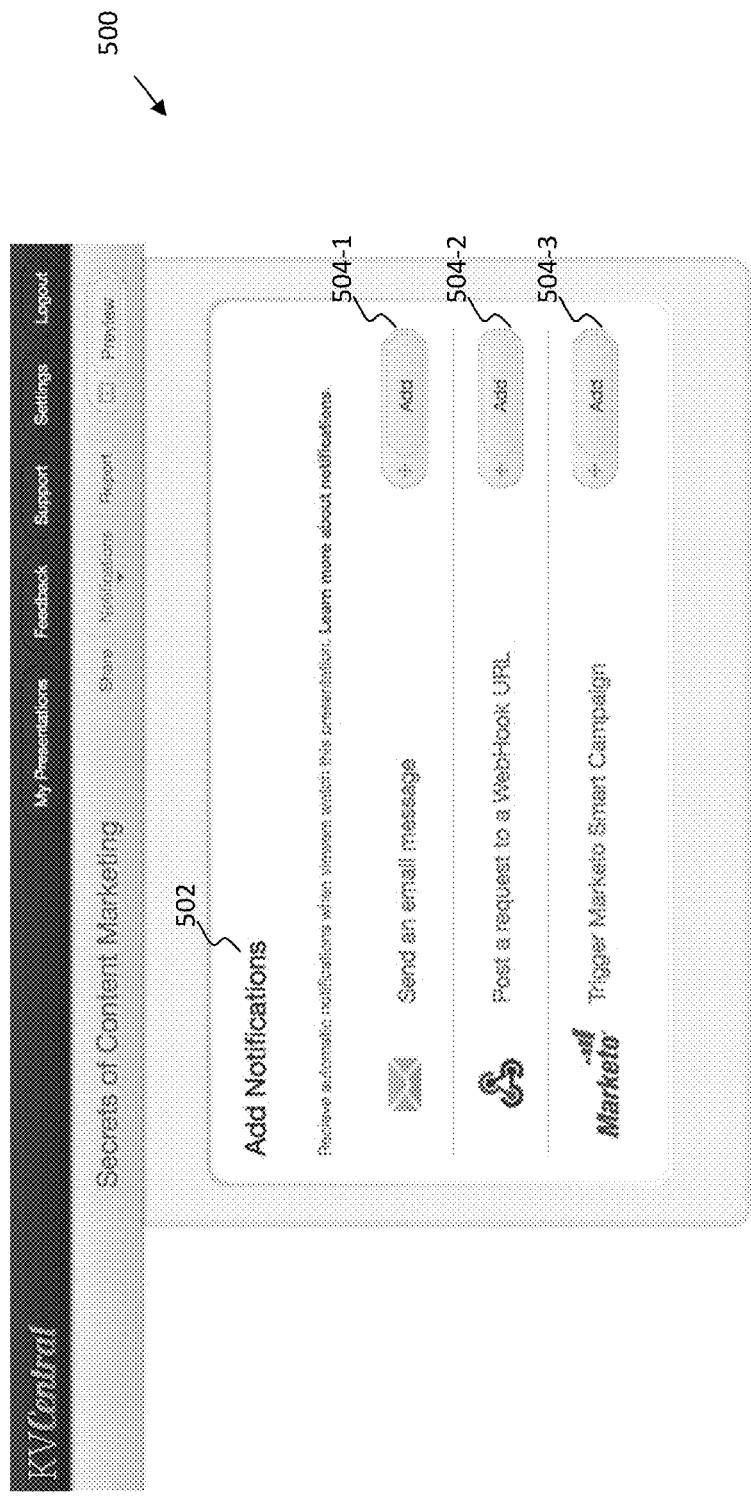
FIGS. 5A, 5B, 5C shows example configuration interfaces for tracking notifications.

FIG. 5A shows an interface 500 in the presentation production client 110-1 or 110-2, which allows content providers to configure tracking notifications 502. This example includes three types of notifications: (1) sending an email message, (2) posting a request to a WebHook URL, and (3) triggering a Marketo Smart Campaign. The content provider may configure one or more of these notifications by clicking a respective Add button 504-1, 504-2, 504-3.

Figure 5B:
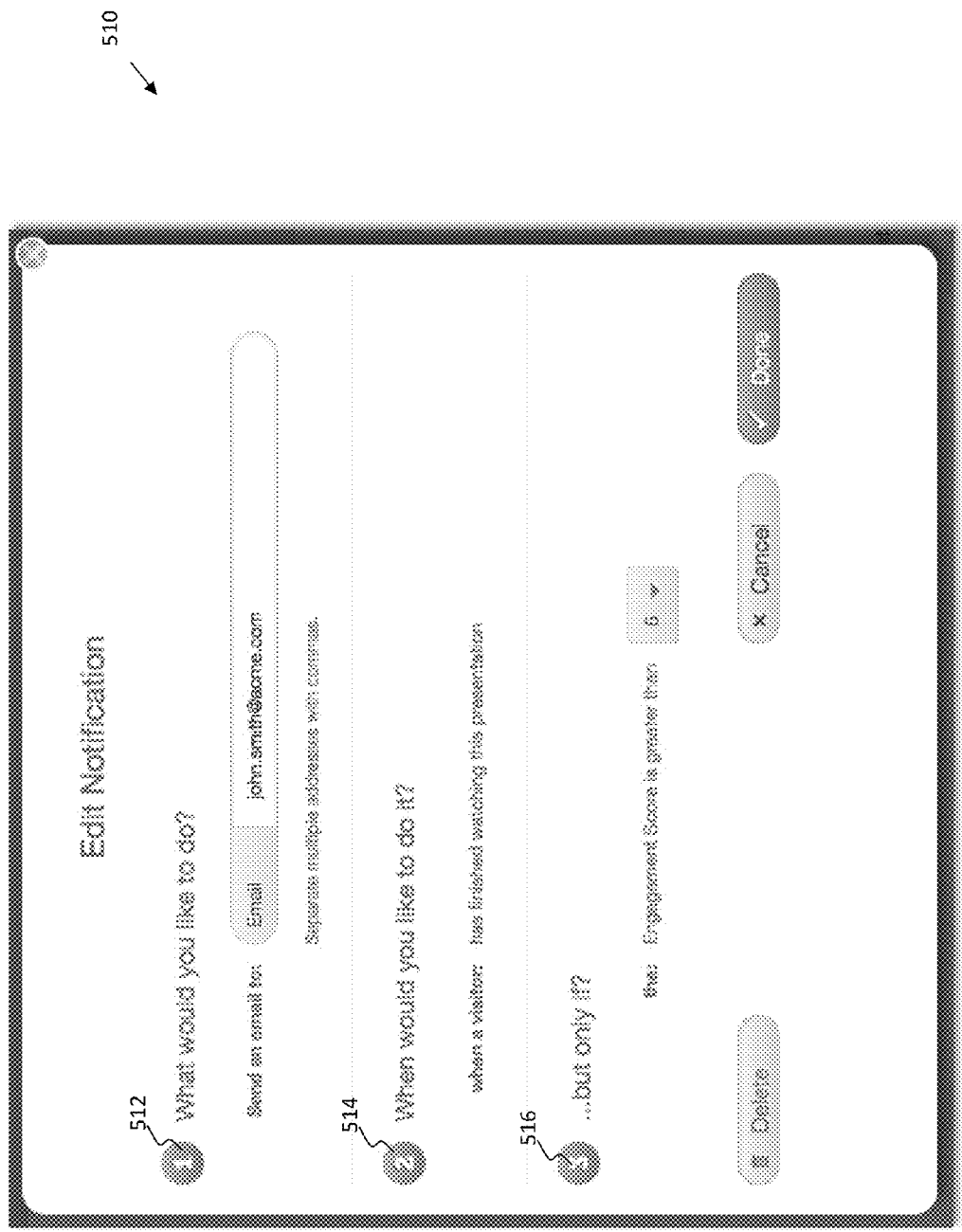

FIG. 5B shows an interface 510 in the presentation production client 110-1 or 110-2, which allows content providers to configure configuring a tracking notification 502 to send an email message. At 512, the content provider may enter one or more email addresses to receive the notification messages. At 514, the content provider may adjust when the notification will be sent, such as after the viewer has finished watching the tracking system presentation. At 516, the content provider may adjust the threshold of the minimum engagement score required to trigger the notification. The email recipients will only receive email notifications each time a viewer watches the presentation and earns an engagement score above the threshold.

It should be noted that the content provider may configure any condition for which the tracking system presentation dispatches trigger notifications. The trigger may cause any specified remedial action, such as a selected marketing campaign, or the dispatch a message to be sent immediately to the visitor when the presentation is over. The content provider can use the presentation production client 110-1, 110-2, for example, to specify that the remedial action triggers a selected marketing campaign via a third party Marketing Automation System.

Figure 5C:

FIG. 5C shows a screenshot of an interface 520 specifying that tracking notifications that have been enabled for a subject tracking system presentation. In this example, an email notification has been configured to trigger whenever a viewer watches this presentation and earns an engagement score greater than 5. The content provider may edit the configuration of this notification by clicking the Edit button 522.

FIG. 5D shows an example of a tracking notification message 530 that would be sent after a tracking system presentation is viewed. The email message includes most of the data collected by the tracking system 100 about the viewer, including tracking data 432 and registration data 434. For example, once a viewer has completed watching a subject tracking system presentation or if the viewer has ended their session, tracking data 432 and registration data 434 may be sent to a marketing automation system. The information may include an identifier, email address, cookie, presentation title, engagement score (0-10 calculated based on a variety of factors) and any other session information that may be relevant to trigger follow-up actions by the Marketing Automation System.

One purpose of the engagement score is to enable a content provider to assemble an aggregate process including a number of factors into an actionable trigger. If a viewer has an engagement score below 3, the content provider may specify that there should be no follow-up action by the Marketing Automation System. If an engagement score in the 4-7 range is assigned to a viewer, then the content provider can set a trigger to ensure there is a follow-up action by the Marketing Automation System. If a viewer is assigned an engagement score between 8-10, then the content provider can set a trigger for immediate action by the Marketing Automation System or otherwise, such as a call to the viewer. In another example, the content provider can configure the tracking system presentation such that it ensures that any viewer who views a certain slide of the presentation receives an immediate follow-up action, such as a call. Similarly, the tracking system presentation can be configured such that if a viewer clicks on a specific link in the presentation, some immediate trigger is issued, such as a follow-up email.

In another example trigger configuration, if the system 100 detects that a viewer is not unique in that the viewer has come back to view a tracking system presentation, the tracking data 432 can be aggregated to an existing record for that particular viewer based on all of their viewing sessions.

Figure 5E:
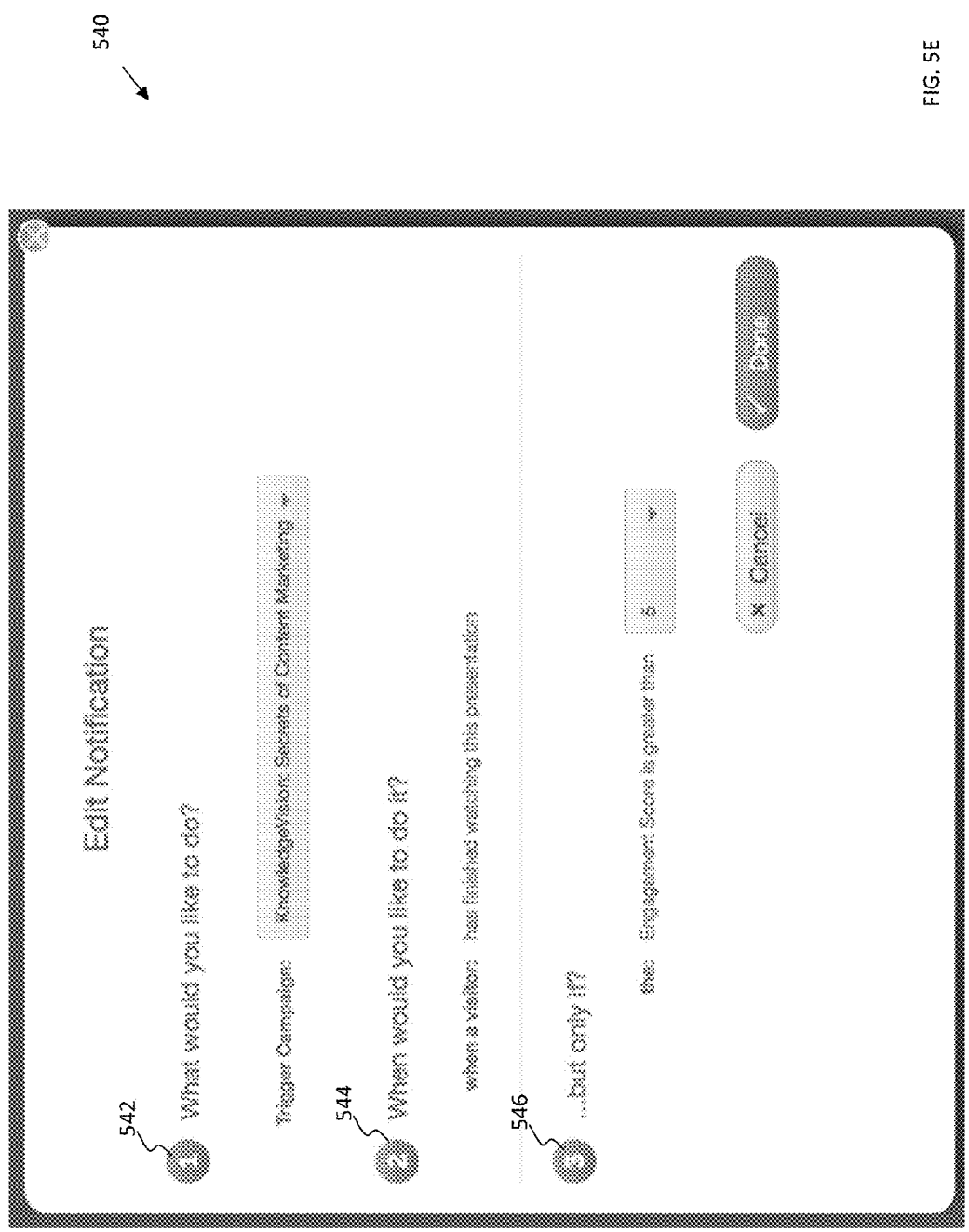
FIGS. 5E, 5F, and 5G show example configuration interfaces for interfacing with a marketing automation system.

FIG. 5E shows an example configuration interface 540 for a tracking notification to trigger a third party marketing automation system. The marketing automation system may be a software system that streamlines and integrates the functions of marketing and sales departments. For example, the marketing automation system can be configured to track prospects and leads that have been acquired by analyzing a tracking data 432 including information about the viewer's clickstream. Based on the tracking data/clickstream 432, the marketing automation system can develop a history and a lead that can trigger actions, such as emails or notifications to a sales person. In this way, it can provide a lead history management system that can take actions based on events. Pardot, Eloqua, Marketo, and HubSpot are examples of third party marketing automation systems compatible with the present tracking system 100.

Figure 5F:
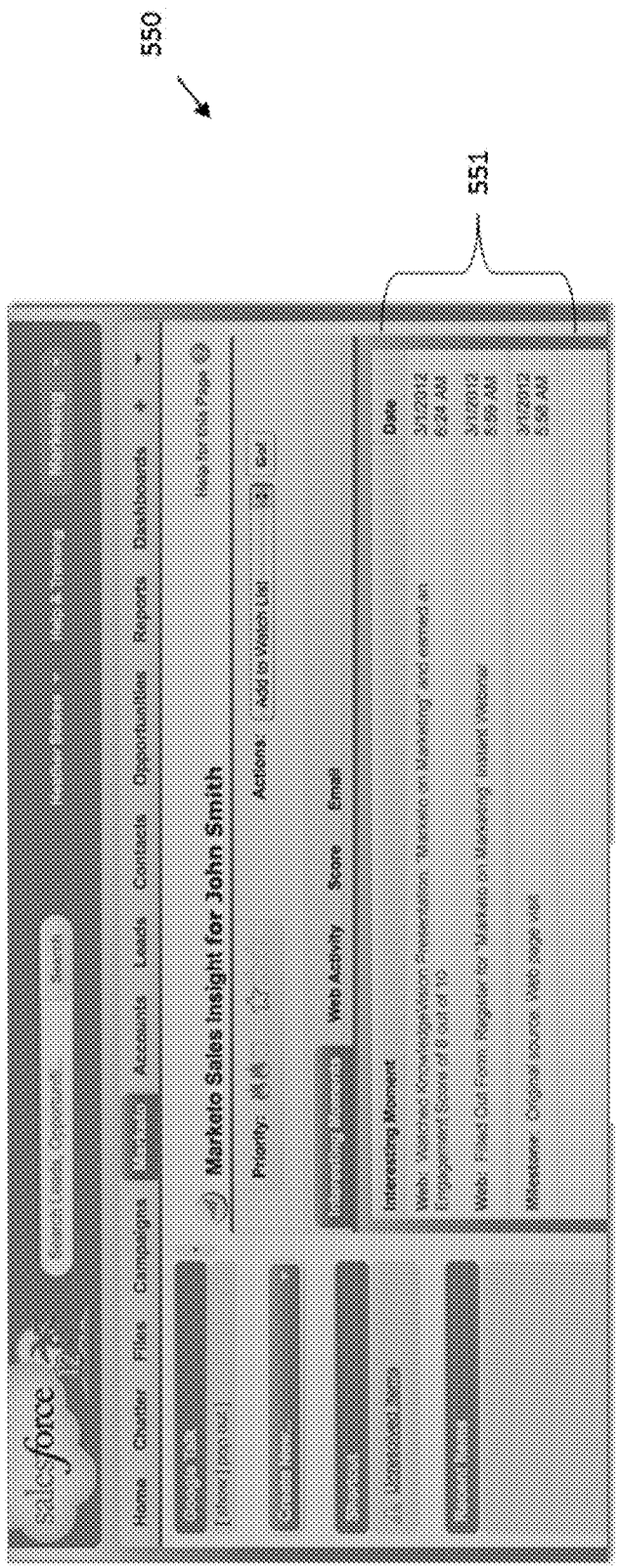
Figure 5G:
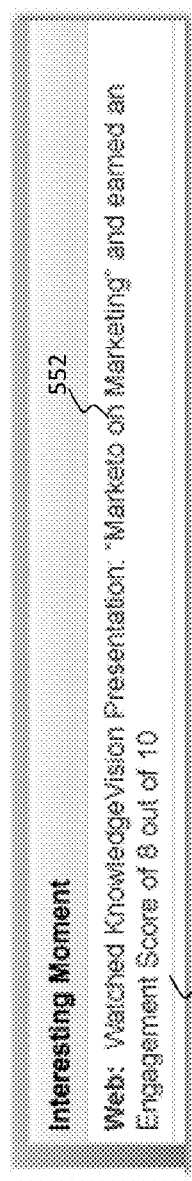

The third party marketing automation system used in the examples of FIGS. 5E and 5F is Marketo. Referring back to FIG. 5E, at 542, the content provider may select the Smart Campaign from their Marketo account. At 544, the content provider can specify when the campaign will be triggered. At 546, the content provider may adjust the threshold of the minimum engagement score required to trigger the tracking notification. In this way, a tracking notification can be configured to send tracking data 432 to a third-party system.

FIG. 5F shows an example of how a third-party service, such as Marketo might use the tracking data 432 received from a tracking notification to perform actions. In this example, Marketo has been configured to report the tracking data 432 to Salesforce, another third-party system, as an "Interesting Moment" for a particular lead. The message includes the title of the presentation 542 and the engagement score 544 earned by the viewer.

Visitor Registration

Figure 6A:
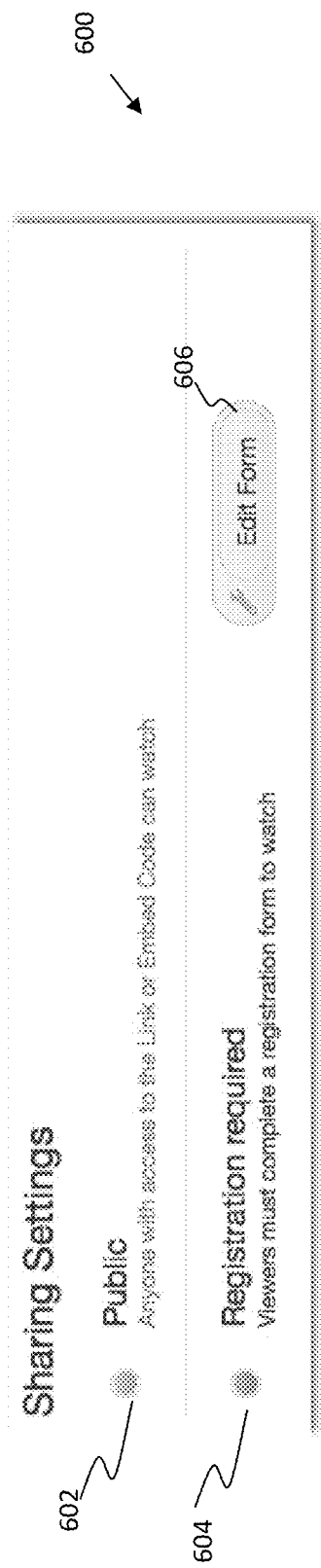
FIG. 6A shows an example configuration interface for registration.

FIG. 6A shows an example interface 600 in presentation production client 110-1 or 110-2 for enabling a tracking registration form. A content provider may select public 602 to allow anyone with access to the tracking system presentation link or embedded code to view the tracking system presentation. A content provider may select the registration required option 604 to generate a registration form that will appear whenever a visitor attempts to watch this particular presentation. The content provider may configure the registration form by clicking the Edit Form 606 button.

Figure 6B:
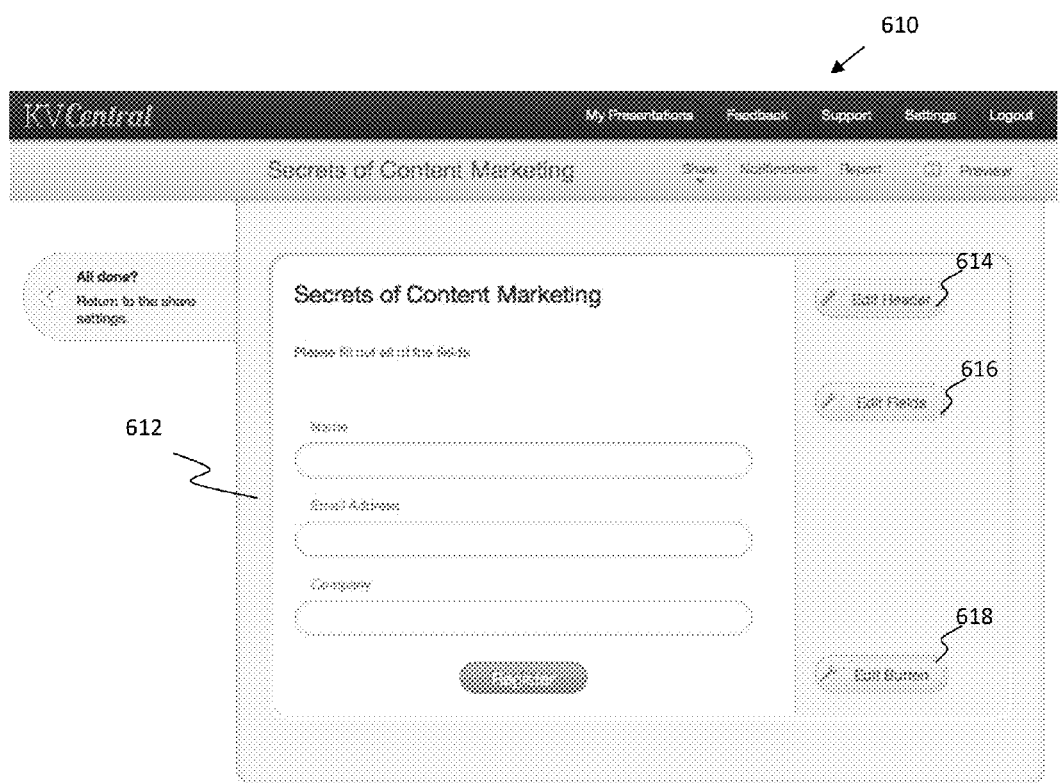

FIG. 6B shows an example interface 610 in the presentation production client 110-1 or 110-2 for configuring a tracking registration form. A preview of the registration form 612 appears, with buttons to edit the title and description 614, form fields 616, and submit button 618.

Figure 6C:
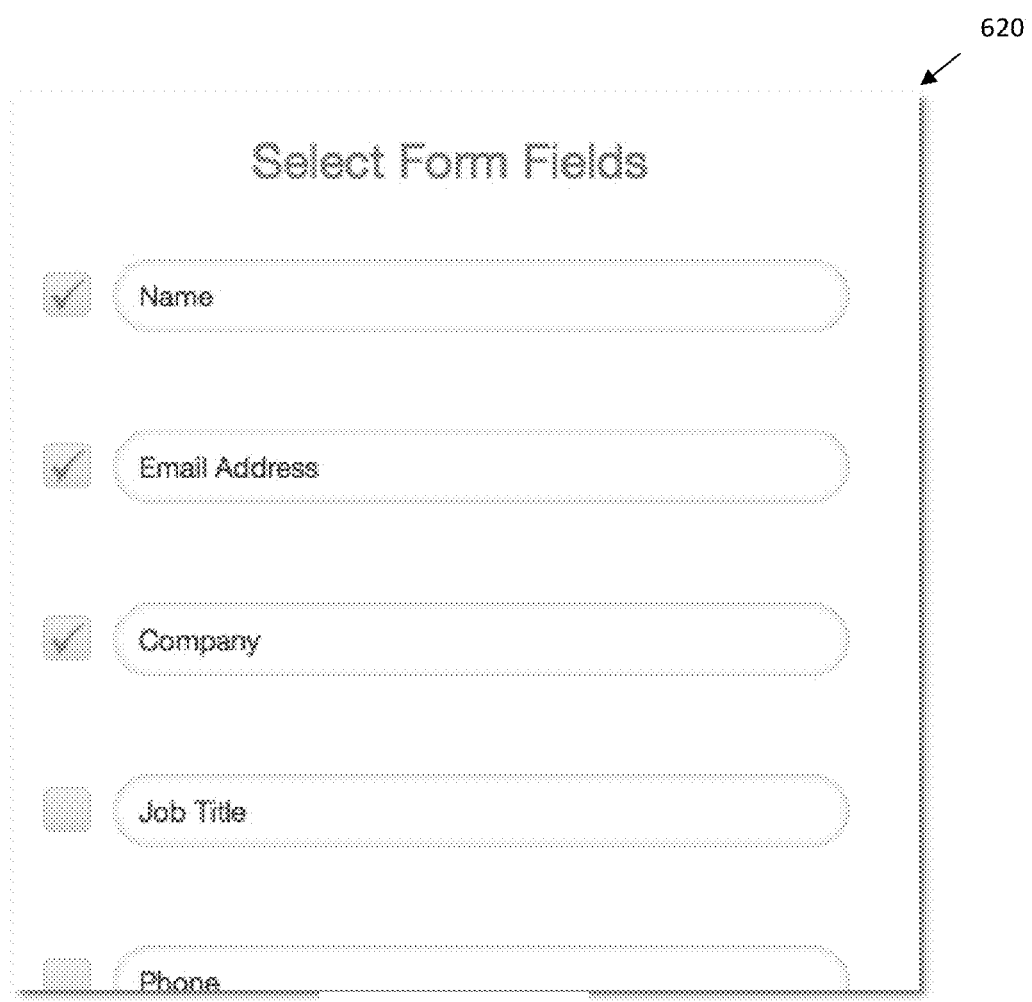

FIGS. 6C and 6D show example interfaces from the presentation production client 110-1, 110-2 for editing the tracking registration form. The interface 620 shows different form fields that may be enabled or disabled by checking the box next to each of them. The interface 630 shows the inputs for changing the title and description text.

FIGS. 6E, 6F, and 6G show different ways in which tracking registration form data is reported to the content provider using the presentation production client 110-1, 110-2. FIG. 6E shows how the tracking registration form data may be reported in the report preview interface 420 discussed in connection with FIG. 4C. FIG. 6F shows how tracking registration form data may be reported in the Excel spreadsheet report 650. FIG. 6G shows how tracking registration form data may be reported in an email notification message 660.

Tracking System Presentation URL Tags

Figures 7A, 7B:
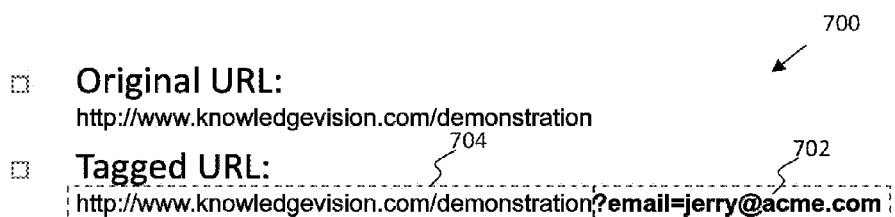
FIGS. 7A and 7B show how tracking system presentation URL tags may be used according to an embodiment.

Tags can be added to a content provider's webpage URL to track specific viewers for the content provider's tracking system presentation 300. FIG. 7A shows an example 700 of how tracking system presentation URL tags 702 can be added to a presentation URL. FIG. 7B shows how tracking system presentation URL tags are reported 720 in an Excel spreadsheet report regarding tracking system presentation Form data. In the FIG. 7A example, a tag for the viewer's email address 703 has been added to tracking system presentation URL 704. FIG. 7B shows an excerpt 710 from an Excel spreadsheet report where the values captured for similar URL Tags are listed 712 for each viewer.

Engagement Score Formula

An engagement score may be calculated based on any formula defined by a content provider. The content provider may be any user of the presentation production client 110-1, 110-2. The content provider may be, for example, the owner or distributor of the content included in the tracking system presentation. The content provider has the ability to configure the engagement weighting score by defining the relevant factors for the calculation, and emphasizing which factors are important, while deemphasizing others.

In one example embodiment, the engagement score is calculated based a viewer's tracking data 432. For example, the tracking data 432 factored into the engagement score may include information about what the viewer clicked on; how much time the viewer spent on the presentation, such as the furthest point (in terms of seconds) that the viewer watched the presentation (as a percentage of the presentation); the elapsed time (the amount of time the viewer spent on a page in the presentation; whether the viewer skipped through the video; whether the viewer went back to view certain portions of the presentation again; whether the viewer clicked on interactive links embedded within the presentation; and information regarding foreground viewing of the presentation versus background viewing (e.g. detection of viewer interaction with content outside of the presentation).

Points can be deducted from an engagement score if the tracking system 100 detects that a viewer has skipped pages in the presentation. A skip through of a video embedded in the presentation may be detected if the amount of time spent on a page in the presentation is less than half of the deepest point of the video that the viewer watched.

Points can be added to an engagement score calculation, for example, if they click on a links in the presentation. Likes to footnotes, attachments, etc. may be added whether or not the viewer clicked on any interactive content.

An example engagement score may be a number in a range from 1 to 10, which can be grouped in "Low," "Medium," and "High" categories. A viewer's tracking data 432 that is calculated to have an engagement score in the "High" category, for example, may be a score of 8, 9, 10. A engagement score in the "High" category indicates that the viewer is heavily engaged with the content of a subject tracking system presentation.

The following is one example of an engagement score formula calculated based on tracking data 432:

T=The elapsed time that the viewer remained on the page (seconds);

V=The farthest time point in the video that the viewer reached (seconds);

D=The total duration of the video (seconds); and

C=The total number of times the viewer clicked on interactive content, including footnote links, downloadable attachments, and hyperlinked images in the template.

$$\text{Engagement Score} = \text{MIN}(\text{MAX}(((V/D)*10)-1,0) * \text{MIN}(((T/V)*2),1) + \text{MIN}(C,1),10)$$

Tracking System Schematics

Figure 8A:
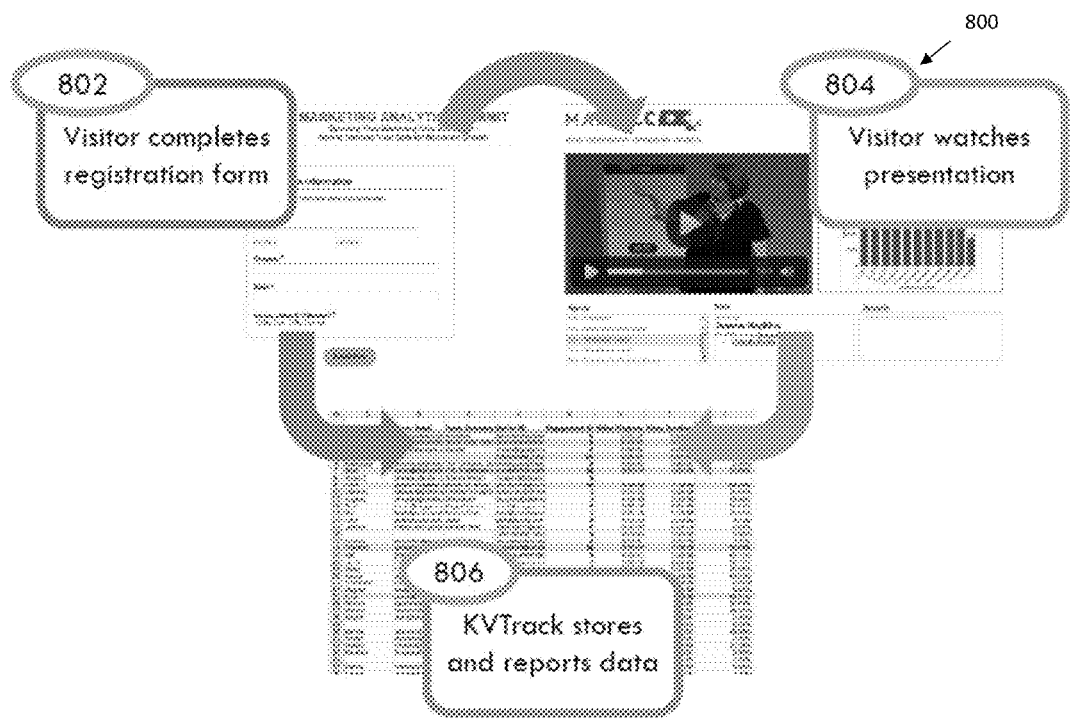
FIGS. 8A and 8B show example workflow schematics of the tracking system associating registration data with tracking data.

FIG. 8A shows a simplified workflow schematic of how the tracking system 100 associates registration data 434 with tracking data 432. At 802, the visitor fills out a registration form. The demographic data that the visitor enters in the form is collected by the tracking system 100 and associated with the visitor based on a unique identifier, typically the visitor's email address. The visitor (now viewer) is redirected to the tracking system presentation at 804, where the tracking system 100 collects tracking data 432. The tracking data 432 is stored at 806 by the tracking system 100. The tracking data 432 is associated with the viewer by the same unique ID.

Figure 8B:
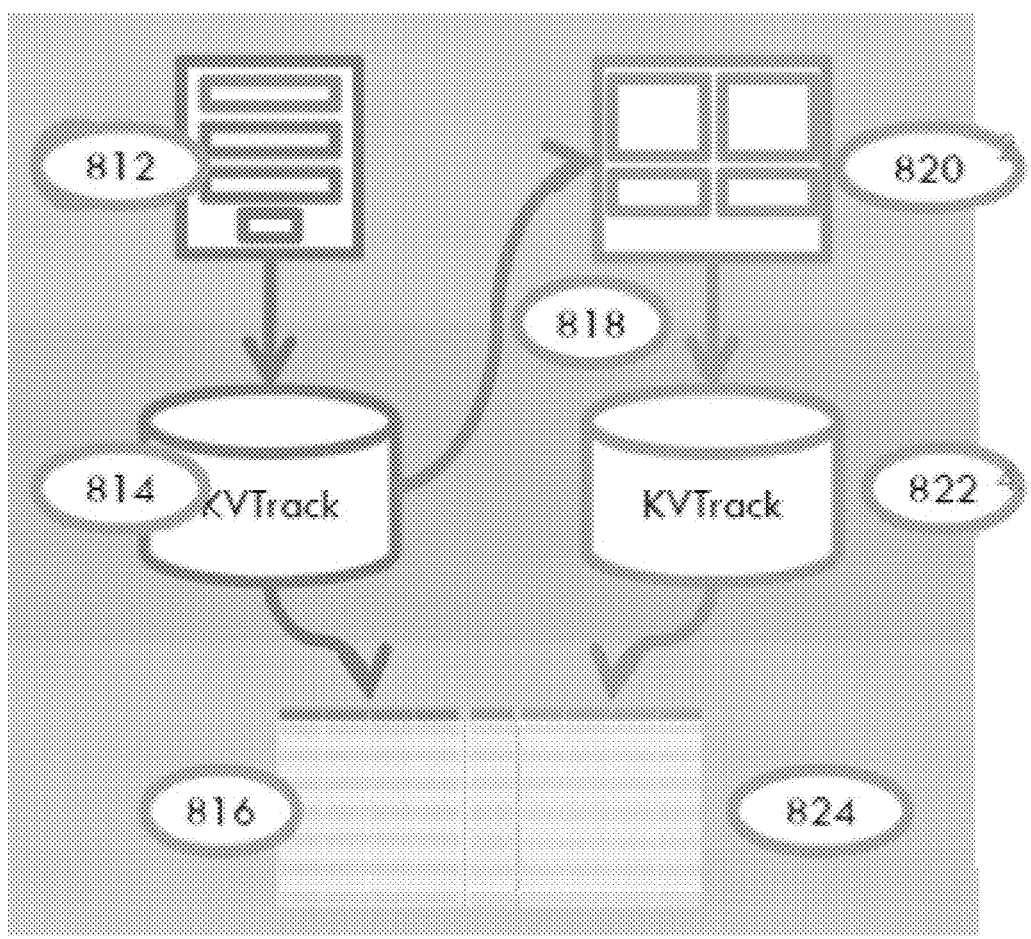

FIG. 8B shows an example workflow schematic of the tracking system 100 associating registration data 434 with tracking data 432. At 812, a viewer submits form data. At 814, the form data is posted to the tracking system 100 via Webhook. At 816, the form data is stored in a tracking report. At 818, the tracking system 100 redirects the viewer via its session to a subject tracking system presentation 300. At 820, the viewer watches the tracking system presentation 300. At 822, the tracking data 432 is tracked by the tracking system 100. At 824, the tracking data 432 is stored in a report.

A third party system may be integrated with the tracking system 100 using HTTP callbacks, such as Webhooks. Webhooks provides a standardized HTTP callback protocol for making an electronic request between the tracking system 100 and the third party system, as well as passing tracking data 432 between the systems. Content Providers can configure the Webhooks using the client publishing application 110-1, 110-2 to trigger events on the viewer's session to invoke behavior on client publishing application 110-1, 110-2. Because the Webhooks use HTTP, web based triggered events can be integrated into the tracking system presentation 300 without adding new infrastructure, such as message queues. While the events may include triggered actions integrated into the tracking system presentation 300, such as specific content delivered to the user, the triggered action taken may be anything specified by the content provider. For example, depending on the engagement score, the triggered events may include actions related to direct mail, contact center integration, or mobile channels campaigns.

Figure 8C:
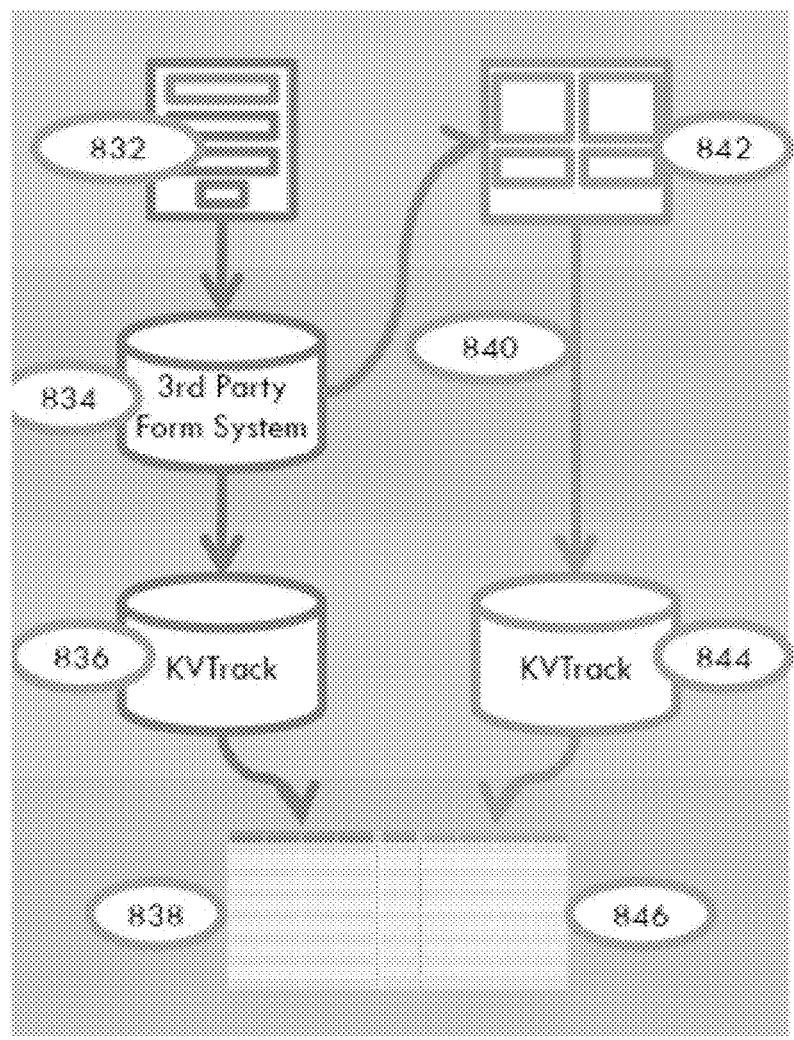
FIG. 8C shows an example workflow schematic of the tracking system integrating with a marketing automation system (MAS).

FIG. 8C shows an example workflow schematic of the tracking system 100 integrating with a third party system. At 832, a visitor submits a request to view a tracking system presentation by submitting a form. At 834, the form data is stored by a third party form system. At 836, form data is transmitted to the MySQL form database 142 via Webhook. At 838, form data is stored in the tracking report. At 840, the third party system redirects the visitor's session to the tracking system presentation via the player 102. At 842, the viewer watches the presentation. At 844, the tracking data 432 is tracked by the tracking system 100, and at 846 the tracking data 432 is stored in a tracking report. With this example configuration, the registration data 434 processed via the forms is received by third party form system, but is still captured by tracking system and associated with the tracking data 432 of the viewer/visitor.

Figure 8D:
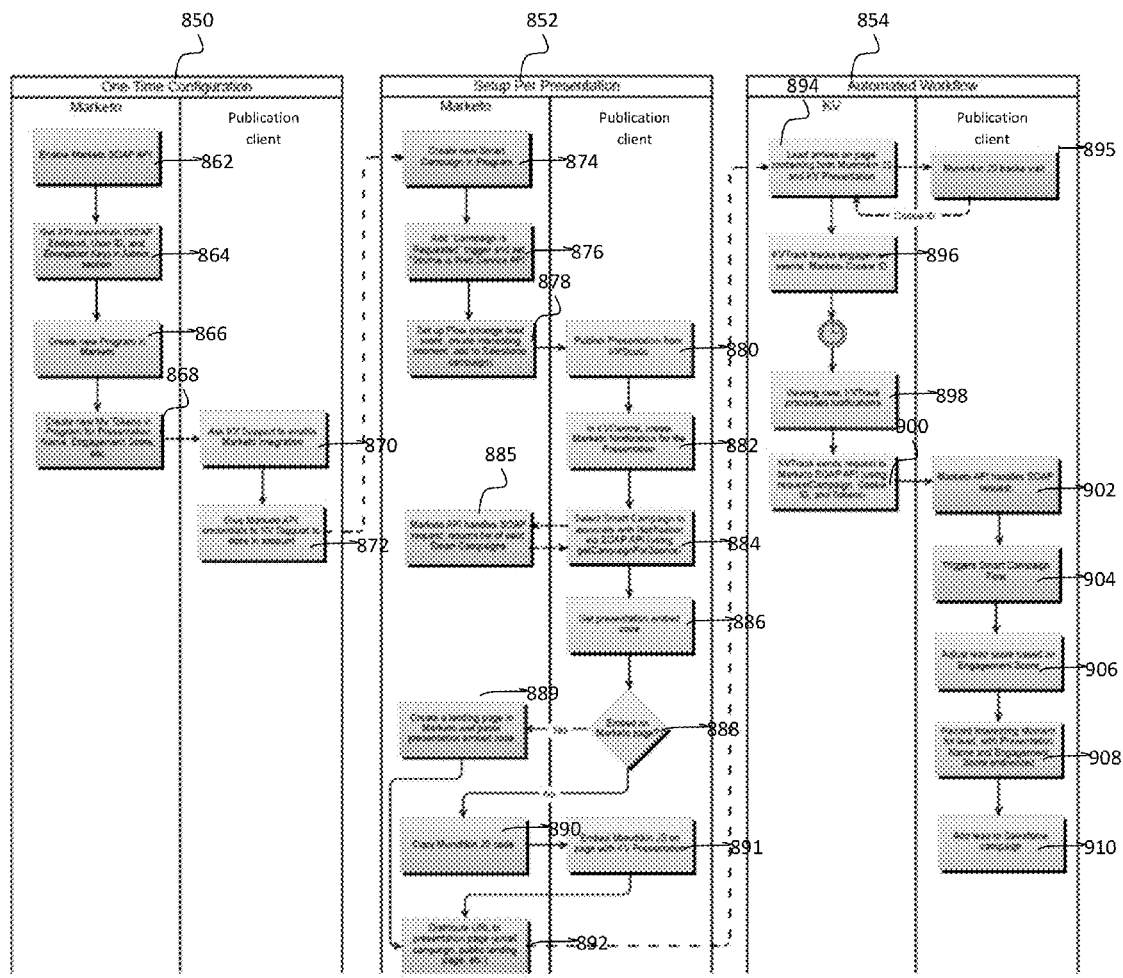
FIG. 8D is an example workflow schematic of the tracking system integrating with the Marketo marketing automation system.

FIG. 8D is an example workflow schematic of the tracking system 100 integrating with the Marketo marketing automation system. The initial configuration with the marketing automation system is at process 850. At 862, the SOAP API is enabled. At 864, the API credentials are obtained (SOAP Endpoint, User ID, and Encryption Key) in the admin section. At 866, a new program is created in the marketing automation system. At 868, a new "My Tokens" program is created for each tracking system presentation 300, which may specify fields for each tracking system presentation, including presentation name, engagement score, etc. At 870, the marketing automation system integration is enabled. At 872, the marketing automation system API credentials are passed to the tracking system presentation service 110.

In 852, the preferences (e.g. trigger actions) for each presentation are configured in connection with the marketing automation system. At 874, a marketing campaign is selected. At 876, the web service API is selected for the campaign at the marketing automation system. At 878, the flow is set up at the marketing automation system. For example, the lead, score, interesting moment, etc. criteria can be added to the marketing campaign. At 880, the tracking system presentation is published using an instance of the presentation publishing client 110-1, 110-2.

At 882, the presentation publishing client configures the tracking notifications 502 for the third party system. At 884, a selected third party marketing campaign is associated with the tracking notifications 502 for the subject tracking system presentation. At 886, presentation embedded code is generated using an instance of the presentation publishing client 110-1, 110-2, which can be embedded on a page generated by the third party system at 888, and at 889 a landing page is created via the third party system, which includes the embedded presentation code. The tracking system presentation 300 may also be generated with Munchkin Java Script code at 891, which can be copied from the third party automation system at 890. At 892, a URL to the tracking system presentation 300 is distributed.

Once the subject tracking system presentation 300 has been integrated with the marketing automation system using the set up process 852, the tracking system presentation is ready to be accessed via visitors/viewers. The automated work flow process 854 shows the steps taken by the tracking system 100 and the marketing automation system in response to a client 150 playing the tracking system presentation. At 894, a cookie ID is assigned to the client 150.

At 896, the tracking system 100 monitors the session and tracks engagement events and related tracking data 434, as well as a cookie ID assigned by the marketing automation system to the client. After the client session is over, at 898, the tracking system processes tracking notifications 502 generated in responses to the tracking data 434. At 900, the tracking system 100 sends a request to the third party system via the SOAP API passing variables including identification of the associated campaign, the client's cookie ID, and token. The third party system handles the SOAP request at 902, and responds by triggering the associated campaign at 904. The lead score associated with the viewer's session is set at 906 to correspond to the engagement score assigned by the tracking system 100. At 908, attributes associated with the viewer, such as interesting moment, presentation name, and engagement score are recorded in connection with the lead in the marketing automation system. At 910, the lead is added to the Salesforce campaign.

While this invention has been particularly shown and described with references to example embodiments thereof, it will be understood by those skilled in the art that various changes in form and details may be made therein without departing from the scope of the invention encompassed by the appended claims.

For instance, while one embodiment discloses that the third party system is a Marketing Automation System, it will be apparent that several other types of third party systems are compatible with the tracking system 100. The third party system may be, for example, a Learning Management System (LMS), Marketing Resource Management (MRM) system, Enterprise Marketing Management (EMM) system, Marketing Asset Management (MAM) system, or Customer Resource Management (CRM) system. Learning Management Systems, for instance, are often used to keep track of and create a catalogue of learning content and keep track of completion. The tracking system 100 may take individual tracking information and pass it through as a completion criteria as part of a Learning Management System. The tracking system 100 can be able to detect if the visitor/viewer was operating in the foreground (e.g. they were not doing email in the background) during the tracking system presentation 300. This foreground/background activity analysis may be useful in determining an engagement score, and can help determine visitor/viewer compliance with a particular continuing education or compliance program associated with completing the course work implemented in the tracking system presentation.

Further, the presentation production client may be implemented as any type of development, management, configuration, or authoring software for a presentation. One such example of authoring software is disclosed in U.S. application Ser. No. 13/303,820, filed on Nov. 23, 2011, the entire teachings of which are incorporated by reference.

What is claimed is:
1. A system for tracking user engagement with an interactive online presentation, the system comprising:
an electronic media player, implemented with one or more processors, the electronic media player in communication with a tracking system presentation, the tracking system presentation being a presentation with interactive tracking features and configured to track a user's browser session activity and clickstream data generated at a client system from which the user is operating, the tracked data reflecting the user's level of engagement with the tracking system presentation, the electronic media player configured to:

implement the tracking system presentation in the user's browser session;
generate an ID associated with the user;
receive data from an event monitor arranged to track the user's foreground and background browser session activity and clickstream data in the tracking system presentation during playback of the tracking system presentation, the background browser session activity being user interaction with content outside of the tracking system presentation;
dynamically configure, place and display a just-in-time interactive link during playback of the tracking system presentation that further tracks the user's level of engagement with the tracking system presentation; and
dispatch a data package including the tracked data to an auto-scaling group of track instance servers through an elastic load balancer to improve scalability; and
the auto-scaling group of track instance servers configured to automatically respond to the receipt of the data package of the tracked data by:
processing the data package of the tracked data, the data package including the ID, the user's browser session data, and the user's clickstream data;
dynamically creating entries in a database corresponding to the tracked data;
storing the tracked data in the dynamically created entries;
calculating an engagement score for the user based on the tracked data stored in the database, the engagement score being a qualified measurement of the user's level of engagement with the tracking system presentation that is calculated based at least upon:
user interaction with the just-in-time interactive link in the tracking system presentation,
whether the user viewed portions of the tracking system presentation more than once,
how much time the user spent viewing the tracking system presentation,
the amount of foreground versus background session activity by the user, such that the value of the engagement score is lower if relatively high background session activity by the user is detected, and
respective content provider selected weightings given to each of the foreground session activity, the background session activity, the clickstream data, and user engagement with the link,
configuring a plurality of threshold trigger points in a range of engagement scores, each of the trigger points, when attained by a user, automatically triggering an unique follow-up event by a third party system; and
sending the engagement score and at least a portion of the tracked data to the third party system.

2. The system as in claim 1 wherein the tracking system presentation is an interactive presentation structured with chapters, footnotes, presentation slides, and action buttons.

3. The system as in claim 1 wherein the just-in-time interactive link in the tracking system presentation is an interactive footnote.

4. The system as in claim 1 wherein the just-in-time interactive link is offered to the user via the tracking system presentation to measure the user's foreground and background session activity.

5. The system as in claim 3 wherein the engagement score is increased if the tracking data indicates that the user interacted with the just-in-time interactive link.

6. The system as in claim 5 wherein
a given one of the plurality of threshold trigger points triggers an immediate event to facilitate a call to the user in response to the increased engagement score.

7. The system as in claim 1 wherein the player further includes a wrapper that manages communications with the auto-scaling group of track instance servers, the tracking data being sent to the auto-scaling group of track instance servers via the player wrapper.

8. The system as in claim 1 wherein the auto-scaling group of track instance servers is configured to respond to the tracking data by:
queuing a message to be transmitted to the third party system, the message including at least portions of the user's session activity and the calculated engagement score; and
delaying transmission of the message and calculation of the engagement score until after the user operated session on the client system has been ended by the user.

9. The system as in claim 1 wherein each unique event is directed at the user, tracking system presentation, presentation player, or a combination thereof.

10. The system as in claim 1 wherein the value of the engagement score is decreased if it is detected that the user skipped through at least a portion of a video included in the tracking system presentation.

11. The system as in claim 1 wherein the auto-scaling group of track instance servers creates a summary of the user's session activity and the summary is the portion of the tracked data that is sent to the third party system.

12. A computer implemented method of tracking user engagement with an interactive online presentation, the method comprising:
using an electronic media player to track user engagement with an interactive online presentation and trigger a response by:
monitoring playback of a tracking system presentation by tracking foreground and background session activity and clickstream data generated at a client system which a user is operating, the tracked data reflecting the user's level of engagement with the tracking system presentation and the background browser session activity being user interaction with content outside of the tracking system presentation;
generating an ID associated with the user;
dynamically configuring, placing and displaying a just-in-time interactive link during playback of the tracking system presentation that further tracks the user's level of engagement; and
dispatching a data package including the tracked data to an auto-scaling group of track instance servers through an elastic load balancer to improve scalability;
using the auto-scaling group of track instance servers, automatically responding to the receipt of the data package of the tracked data by:
processing the data package of the tracked data, the data package including the ID, the user's browser session data, and the user's clickstream data;
dynamically creating entries in a database corresponding to the tracked data;
storing the tracked data in the dynamically created entries;
calculating an engagement score based on the tracked data stored in the database, the engagement score being a qualified measurement of the user's level of engagement with the tracking system presentation that is calculated based at least upon:
user interaction with the just-in-time interactive link in the tracking system presentation,
whether the user viewed portions of the tracking system presentation more than once,
how much time the user spent viewing the tracking system presentation,
the amount of foreground versus background session activity by the user, such that the value of the engagement score is lower if relatively high background session activity by the user is detected, and
respective content provider selected weightings given to each of the foreground session activity, the background session activity, the clickstream data, and user engagement with the link,
configuring a plurality of threshold trigger points in a range of engagement scores, each of which trigger points, when attained by a user, automatically triggers an unique follow-up event by a third party system; and
sending the engagement score and at least portions of the tracked data to the third party system.

13. A computer program product stored on one or more non-transitory computer readable media, the computer program product including computer readable instructions that cause one or more processors to:
use a media player to track user engagement with an interactive online presentation and trigger a response by:
monitoring playback of a tracking system presentation by tracking user foreground and background session activity and clickstream data generated at a client system from which a user is operating, the tracked data reflecting the user's level of engagement with the tracking system presentation and the background browser session activity being user interaction with content outside of the tracking system presentation;
generating an ID associated with the user;
dynamically configuring, placing and displaying a just-in-time interactive link during playback of the tracking system presentation that further tracks the user's level of engagement; and
dispatching a data package including the tracked data to an auto-scaling group of track instance servers through an elastic load balancer to improve scalability;
use the auto-scaling group of track instance servers to automatically respond to receipt of the data package of the tracked data by:
processing the data package of the tracked data, the data package including the ID, the user's browser session data and the user's clickstream data;
dynamically creating entries in a database corresponding to the tracked data;
storing the tracked data in the dynamically created entries;
calculating an engagement score based on the tracked data stored in the database, the engagement score being a qualified measurement of the user's level of engagement with the tracking system presentation that is calculated based at least upon:
user interaction with the just-in-time interactive link in the tracking system presentation,
whether the user viewed portions of the tracking system presentation more than once,
how much time the user spent viewing the tracking system presentation,
the amount of foreground versus background session activity by the user, such that the value of the engagement score is lower if relatively high background session activity by the user is detected, and
respective content provider selected weightings given to each of the foreground session activity, the background session activity, the clickstream data, and user engagement with the link;
configuring a plurality of threshold trigger points in a range of engagement scores, each of the trigger points automatically triggering an unique follow-up event by a third party system; and
sending the engagement score and at least portions of the tracked data to the third party system.

14. An electronic media player configured to track user engagement with an interactive online presentation, the electronic media player comprising one or more processors, the one or more processors configured to cause the electronic media player to:
track user foreground and background session activity and clickstream data associated with a user's interaction with a tracking system presentation, the tracked data reflecting a user's level of engagement with the tracking system presentation and the background browser session activity being user interaction with content outside of the tracking system presentation;
cache the tracked data;
generate an ID associated with the user;
dynamically configure, place and display a just-in-time interactive link during playback of the tracking system presentation that further tracks the user's level of engagement;
facilitate playback of the tracking system presentation in a user session; and
dispatch a data package including the tracked data to an auto-scaling group of track instance servers through an elastic load balancer to improve scalability.

* * * * *